United States Patent
Kai

(10) Patent No.: US 8,331,780 B2
(45) Date of Patent: Dec. 11, 2012

(54) OPTICAL PACKET SWITCHING APPARATUS AND OPTICAL PACKET SWITCHING METHOD

(75) Inventor: Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 12/363,203

(22) Filed: Jan. 30, 2009

(65) Prior Publication Data

US 2009/0196607 A1 Aug. 6, 2009

(30) Foreign Application Priority Data

Feb. 1, 2008 (JP) ................................ 2008-022402

(51) Int. Cl.
 *H04J 14/00* (2006.01)
(52) U.S. Cl. ....................................................... 398/51
(58) Field of Classification Search .................... 398/48, 398/79
 See application file for complete search history.

(56) References Cited

U.S. PATENT DOCUMENTS

| | | | |
|---|---|---|---|
| 2002/0063926 A1* | 5/2002 | Nishi et al. ..................... | 359/128 |
| 2003/0156841 A1* | 8/2003 | Chraplyvy et al. ............. | 398/79 |
| 2006/0098981 A1* | 5/2006 | Miura et al. ..................... | 398/45 |
| 2007/0110439 A1* | 5/2007 | Beshai et al. ................... | 398/45 |

FOREIGN PATENT DOCUMENTS

| | | |
|---|---|---|
| JP | 05-244649 | 9/1993 |
| JP | 09-326771 | 12/1997 |
| JP | 2003-078485 | * 3/2003 |

OTHER PUBLICATIONS

Machine translation of JP2033-078485, Publshed Mar. 14, 2003, Inventor Furumoto Hideji.*

* cited by examiner

*Primary Examiner* — Yuanda Zhang
*Assistant Examiner* — Tuan Nguyen
(74) *Attorney, Agent, or Firm* — Staas & Halsey LLP

(57) ABSTRACT

An apparatus has a plurality of transmitters for transmitting optical packet signals having wavelengths; a multiplexer for multiplexing the optical packet signals transmitted by the plurality of transmitters; a packet scheduler controlling a timing at which each of the transmitters transmits the optical packet signal; and an assister for controlling power of assist light in accordance with a signal from the packet scheduler and causing the assist light to be wavelength-multiplexed with the wavelength multiplexed light such that a total sum of power of the wavelength multiplexed light and the power of the assist light is held constant under a predetermined condition.

11 Claims, 13 Drawing Sheets

OPTICAL PACKET SWITCHING APPARATUS AND OPTICAL PACKET SWITCHING METHOD

CROSS-REFERENCE TO RELATED APPLICATIONS

This application is related to and claims the benefit of priority from JP2008-022402, filed on Feb. 1, 2008, the entire contents of which are incorporated herein by reference.

BACKGROUND

1. Field

This disclosure relates to an optical packet switching apparatus and an optical packet switching method for switching over a path of an optical packet signal.

2. Description of the Related Art

Currently, a WDM (Wavelength Division Multiplexing) transmission is the dominant form of trunk optical communication network system. In the future, from the viewpoint of increasing the network use efficiency, an optical packet switching network is expected in which an optical signal has a smaller granularity. A path of an optical packet may be switched over on the order of a micron-second to a nano-second, instead of a second to a millisecond, while the signal is kept in the state of light.

A large-scaled (N×N)-matrix optical packet switching apparatus capable of performing multi-dimensional connections is needed to realize the optical packet switching apparatus in the WDM transmission system. However, such an optical packet switching apparatus is not yet practical. In trying to realize the multi-dimensional connections by connecting many small-scaled optical packet switching apparatuses in multiple stages, a large number of optical packet switching apparatuses and various optical parts are needed. Therefore, realizing the multi-dimensional connections is difficult with respect to size and cost.

In the optical packet switching network to be realized for enabling a wide-band and flexible network construction, a delivery/coupling optical switching apparatus is proposed in which elements for switching over small-scaled optical switches at high speed, or SOAs (Semiconductor Optical Amplifiers) for turning on/off the optical signals, etc. are connected in multiple stages.

In the above-described delivery/coupling optical switching apparatus, a branch loss is compensated for by amplifying an optical signal with an amplifier, e.g., an EDFA (Erbium-Doped Fiber Amplifier), whenever the optical signal is branched by each of (1:X)-branch coupler which are connected in a cascaded manner to minimize deterioration of an optical SN (Signal/Noise) ratio.

On the other hand, a wavelength-selective optical switching apparatus is proposed in which a plurality of wavelength variable transmitters and wavelength multiplexers/demultiplexers are utilized to realize multi-dimensional connections by assigning a wavelength per port (see, e.g., Japanese Laid-open Patent Publication No. 5-244649).

SUMMARY

According to an aspect of an embodiment, an apparatus comprises a plurality of transmitters for transmitting optical packet signals having wavelengths; a multiplexer for multiplexing the optical packet signals transmitted by the plurality of transmitters; a packet scheduler controlling a timing at which each of the transmitters transmits the optical packet signal; and an assister for controlling power of assist light in accordance with a signal from the packet scheduler and causing the assist light to be wavelength-multiplexed with the wavelength multiplexed light such that a total sum of power of the wavelength multiplexed light and the power of the assist light is held constant under a predetermined condition.

The above-described embodiments of the present invention are intended as examples, and all embodiments of the present invention are not limited to including the features described above.

DETAILED DESCRIPTION OF THE PREFERRED EMBODIMENTS

Figure 1:
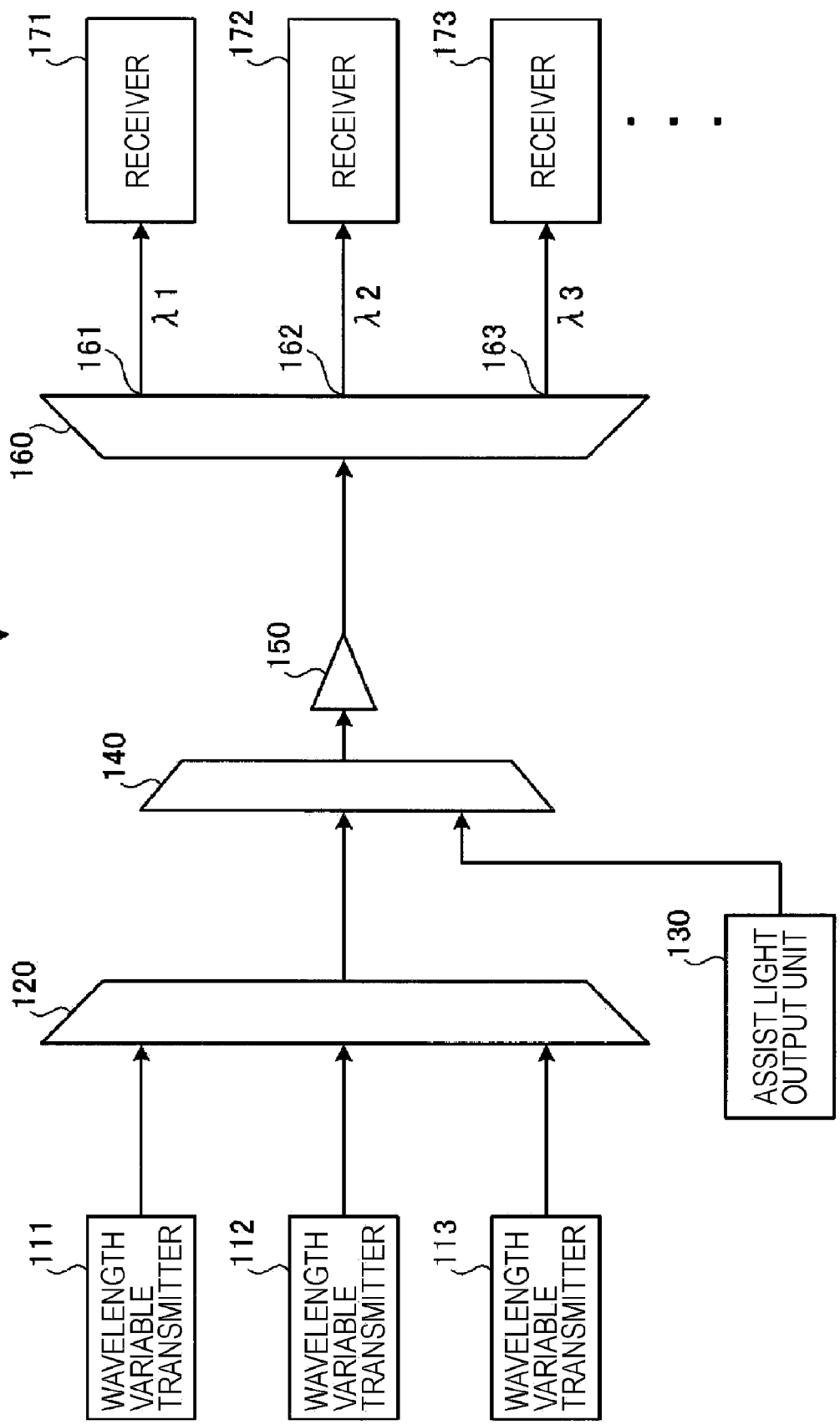
FIG. 1 is a block diagram illustrating the functional configuration of an optical packet switching apparatus of a first embodiment.

Reference may now be made in detail to embodiments of the present invention, examples of which are illustrated in the accompanying drawings, wherein like reference numerals refer to like elements throughout.

Preferred embodiments of an optical packet switching apparatus and an optical packet switching method of the present invention will be described in detail below with reference to FIGS. 1 to 13.

First Embodiment

FIG. 1 is a block diagram illustrating the functional configuration of an optical packet switching apparatus of a first embodiment. The optical packet switching apparatus 100 of the first embodiment includes a plurality of wavelength variable transmitters 111 through 113, a multiplexer 120, an assist light output unit 130, a multiplexer 140, an amplifier 150, a demultiplexer 160, and a plurality of receivers 171, 172, 173, etc. The optical packet switching apparatus 100 is a wavelength-selective switching apparatus which controls the wavelength of an optical packet signal such that each optical packet is output through an arbitrarily set path.

Each of the wavelength variable transmitters 111 through 113 produces an optical packet signal having a variable wavelength. Each of the wavelength variable transmitters 111 through 113 outputs the produced optical packet signal to the multiplexer 120. The multiplexer 120 serves as a multiplexing stage to multiplex the optical packet signals which are output respectively from the wavelength variable transmitters 111 through 113. The multiplexer 120 outputs the resulting wavelength multiplexed light to the multiplexer 140. The multiplexer 120 may be made up of, e.g., a coupler or a WSS (Wavelength Selection Switch).

The assist light output unit 130 and the multiplexer 140 (second multiplexer) provide an assister to multiplex power assist (makeup) light with the wavelength multiplexed light in a stage upstream of the amplifier 150, the assist light having power selected such that a total sum of power of the wavelength multiplexed light obtained with the wavelength multiplying by the multiplexer 120 and power of the assist light is held constant. In other words, the assist light output unit 130 outputs the assist light to the multiplexer 140.

The multiplexer 140 multiplexes the wavelength multiplexed light output from the multiplexer 120 and the assist light output from the assist light output unit 130. The multiplexer 140 outputs the resulting wavelength multiplexed light to the amplifier 150. The multiplexer 140 may be made up of, e.g., a coupler or a WSS. Further, both the multiplexer 120 and the multiplexer 140 may be made up of, e.g., one coupler or one WSS. The optical packet signals output from the wavelength variable transmitters 111 through 113 and the assist light output from the assist light output unit 130 may be wavelength-multiplexed together by the multiplexer 120. With such an arrangement, the multiplexer 140 may be omitted.

The amplifier 150 amplifies the wavelength multiplexed light output from the multiplexer 140. The amplifier 150 outputs the amplified wavelength-multiplexed light to the demultiplexer 160. The amplifier 150 may be an amplifier executing APC (auto power control) so that power of the output wavelength-multiplexed light is held constant under a certain condition, or an amplifier providing a constant gain to the wavelength multiplexed light output from the multiplexer 140. The amplification by the amplifier 150 may compensate for losses of the respective lights caused in the multiplexer 120 and the multiplexer 140.

The demultiplexer 160 demultiplexes the wavelength multiplexed light output from the amplifier 150. The demultiplexer 160 may be made up of a coupler. The demultiplexer 160 has a plurality of ports 161, 162, 163, etc. The ports 161, 162, 163, etc. correspond respectively to wavelengths $\lambda 1$, $\lambda 2$, $\lambda 3$, etc. ($\lambda 1 < \lambda 2 < \lambda 3$, etc.).

The demultiplexer 160 outputs each of the demultiplexed optical packet signals from one of the ports 161, 162, 163, etc., which corresponds to the desired wavelength. For example, the demultiplexer 160 outputs, among the demultiplexed optical packet signals, the optical packet signal having the wavelength $\lambda 1$ to the receiver 171 through the port 161, the optical packet signal having the wavelength $\lambda 2$ to the receiver 172 through the port 162, and the optical packet signal having the wavelength $\lambda 3$ to the receiver 173 through the port 163.

The optical packet signals output from the plural ports 161, 162, 163, etc. of the demultiplexer 160 are received respectively by the receivers 171, 172, 173, etc. The stage downstream of the demultiplexer 160 is not limited to the receivers 171, 172, 173, etc. For example, if the optical packet switching apparatus 100 were used as a path selection switch in an optical transmission line, the ports 161, 162, 163, etc. may be connected to optical fibers providing different paths.

Figure 2:
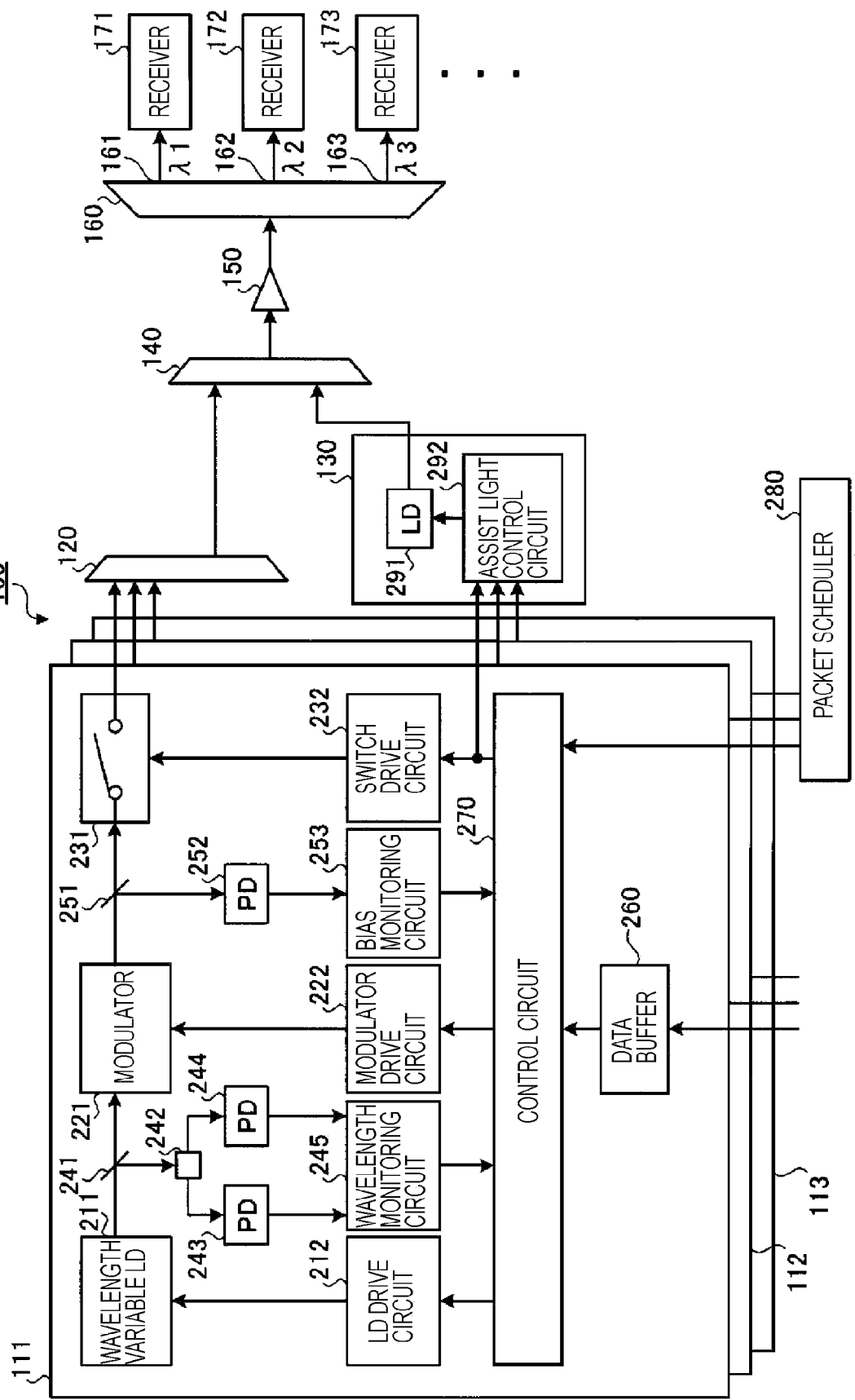
FIG. 2 is a block diagram illustrating a concrete example of the configuration of the optical packet switching apparatus illustrated in FIG. 1.

FIG. 2 is a block diagram illustrating a concrete example of the configuration of the optical packet switching apparatus illustrated in FIG. 1. Similar components in FIG. 2 to those in FIG. 1 are denoted by the same reference numerals and a description of those components is omitted here. The wavelength variable transmitter 111 includes a wavelength variable LD 211, an LD drive circuit 212, a modulator 221, a modulator drive circuit 222, a gate switch 231, a switch drive circuit 232, a splitter 241, a (WDM) coupler 242, a PD 243, a PD 244, a wavelength monitoring circuit 245, a splitter 251, a PD 252, a bias monitoring circuit 253, a data buffer 260, and a control circuit 270.

The wavelength variable LD 211 and the modulator 221 provide a producer for producing an optical signal having a variable wavelength. The wavelength variable LD 211 outputs continuous light to the modulator 221. Further, the wavelength variable LD 211 changes the wavelength of the output continuous light under the control of the LD drive circuit 212. The modulator 221 modulates the continuous light output from the wavelength variable LD 211 under the control of the modulator drive circuit 222. The modulator 221 outputs the modulated optical signal to the gate switch 231.

Under the control of the switch drive circuit 232, the gate switch 231 allows passage of the optical signal output from the modulator 221 (turning-on) or blocks off the optical signal (turning-off). The gate switch 231 may be made up of, e.g., a SOA (Semiconductor Optical Amplifier). During a wavelength switching period, the gate switch 231 blocks off the optical signal output from the modulator 221. The term "wavelength switching period" means a period during which the wavelength of the continuous light output from wavelength variable LD 211 is switched over under the control of the LD drive circuit 212.

For example, the gate switch 231 intermittently blocks off the optical signal output from the modulator 221 such that the optical signal is divided in units of the optical packet signal. Because the wavelength is switched over, for example, in units of the optical packet signal, the optical signal may be blocked off during the wavelength switching period by blocking off the optical signal output in a way to intermittently block off the optical signal in units of the optical packet signal. The gate switch 231 outputs the optical packet signal, produced by dividing the optical signal, to the multiplexer 120. Further, the gate switch 231 turns on/off the optical packet signal under the control of the switch drive circuit 232.

The splitter 241 may be disposed between the wavelength variable LD 211 and the modulator 221. The splitter 241 splits part of the continuous light output from the wavelength variable LD 211 toward the modulator 221, and then outputs the split light to the WDM coupler 242. The WDM coupler 242 separates the continuous light output from the splitter 241 depending on wavelengths and outputs the separated lights having respective wavelengths to the PD 243 and the PD 244.

Each of the PD 243 and the PD 244 outputs, to the wavelength monitoring circuit 245, an electrical signal corresponding to power of the light output from the WDM coupler 242. The wavelength monitoring circuit 245 monitors the wavelengths of the continuous light, which is output from the wavelength variable LD 211 to the modulator 221, based on a power ratio between the electrical signals output from the PD 243 and the PD 244. The wavelength monitoring circuit 245 outputs information regarding the monitored wavelengths of the continuous light to the control circuit 270.

The splitter 251 may be disposed between the modulator 221 and the gate switch 231. The splitter 251 splits part of the optical signal output from the modulator 221 toward the gate switch 231, and then outputs the split signal to the PD 252. The PD 252 outputs, to the bias monitoring circuit 253, an electrical signal corresponding to power of the light output from the splitter 251. The bias monitoring circuit 253 monitors the state of a bias (extinction) ratio of the modulator 221 based on the electrical signal output from the PD 252. The bias monitoring circuit 253 outputs information regarding the monitored bias to the control circuit 270.

Data to be transmitted as the optical packet signal by the wavelength variable transmitter 111 may be input to the data buffer 260 from the outside of the optical packet switching apparatus 100. The data buffer 260 accumulates the input data. Further, the data buffer 260 outputs the accumulated data to the control circuit 270 under the control of the control circuit 270.

The control circuit 270 may be made up of, e.g., a CPU (Central Processing Unit). The control circuit 270 controls the wavelength of the continuous light transmitted by the wavelength variable LD 211, the modulation of the continuous light by the modulator 221, the turning-on/off of the gate switch 231, and the timing of changing the ON/OFF-state of the gate switch 231. More specifically, the control circuit 270 controls the wavelength of the continuous light, which is output from the wavelength variable LD 211, through the LD drive circuit 212. Further, the control circuit 270 controls the wavelength of the continuous light based on the wavelength information output from the wavelength monitoring circuit 245.

The control circuit 270 selectively and dynamically controls the wavelength of the continuous light output from the wavelength variable LD 211 to be one of $\lambda 1$, $\lambda 2$, $\lambda 3$, etc. As a result, the control circuit 270 may output the optical packet signal, which is output from the wavelength variable transmitter 111, from the arbitrarily set one of the ports 161, 162, 163, etc. of the demultiplexer 160.

The control circuit 270 controls the modulation of the continuous light by the modulator 221 through the modulator drive circuit 222 based on data output from the data buffer 260. As a result, the optical signal output from the modulator 221 becomes an optical signal based on the data output from the data buffer 260. Further, the control circuit 270 controls the state of the bias in the modulator 221 based on the bias information output from the bias monitoring circuit 253.

The control circuit 270 switches over the turning-on/off of the gate switch 231 through the switch drive circuit 232. More specifically, the control circuit 270 turns on the gate switch 231 by outputting an ON-signal to the gate switch 231, and turns off the gate switch 231 by outputting an OFF-signal to the gate switch 231. Further, the control circuit 270 outputs the ON-signal and the OFF-signal (i.e., switching information), which are output to the gate switch 231, to the assist light output unit 130 as well.

While the configuration of the wavelength variable transmitter 111 has been described above, each of the other wavelength variable transmitters 112 and 113 also has the similar configuration. The control circuit 270 in each of the wavelength variable transmitters 111 through 113 determines the wavelength of the continuous light transmitted by the wavelength variable LD 211, the modulation of the continuous light by the modulator 221, and the timing of changing the ON/OFF-state of the gate switch 231 in accordance with commands (hereinafter also called signals in some cases) output from a packet scheduler 280.

The packet scheduler 280 may be disposed in the optical packet switching apparatus 100 to be shared by all the wavelength variable transmitters 111 through 113. The packet scheduler 280 manages control of the timing of transmitting the respective optical packet signals from the wavelength variable transmitters 111 through 113 and respective paths of the optical packet signals. More specifically, the packet scheduler 280 outputs, to the control circuit 270 in each of the wavelength variable transmitters 111 through 113, a transmission command for starting transmission of the optical packet signal, a stop command for stopping the transmission of the optical packet signal, a path switching command for switching over the path of the optical packet signal, a path delete command for deleting the path of the optical packet signal, etc.

The assist light output unit 130 includes an LD 291 and an assist light control circuit 292. The LD 291 is a light source for outputting, as the assist light, continuous light having a fixed wavelength to the multiplexer 140. The LD 291 changes power of the output assist light under the control of the assist light control circuit 292. The assist light output from the LD 291 has a wavelength which differs from the wavelengths of the optical packet signals transmitted by the wavelength variable transmitters 111 through 113, and which falls within an amplification band of the amplifier 150.

The assist light control circuit 292 may be made up of a CPU that is, for example, common to the control circuit 270. The assist light control circuit 292 calculates the number (0 through 3 in this embodiment) of multiplexed wavelengths in the wavelength multiplexed light to be output from the multiplexer 120 in a next signal output period based on the ON-information and the OFF-information output from the control circuit 270 in each of the wavelength variable transmitters 111 through 113.

The assist light control circuit 292 calculates a power of the wavelength multiplexed light to be output from the multiplexer 140 based on the calculated number of multiplexed wavelengths. The assist light control circuit 292 dynamically controls the power of the assist light output from the LD 291 such that a total sum of the calculated power of the wavelength multiplexed light and the power of the assist light is held constant. Thus, the assist light control circuit 292 controls the power of the assist light in accordance with the command output from the packet scheduler 280.

A delay difference may occur due to different physical characteristics, such as respective path lengths, between the optical packet signal, which is transmitted under the control of the control circuit 270 and is input to the multiplexer 140 through the gate switch 231 and the multiplexer 120, and the assist light which is output from the assist light output unit 130 and is input to the multiplexer 140 based on the ON-information and the OFF-information from the control circuit 270.

The assist light control circuit 292 controls the timing of outputting the assist light from the LD 291 so as to compensate for the delay difference between the optical packet signal input to the multiplexer 140 and the assist light. More specifically, the assist light control circuit 292 controls the timing of emission of the assist light by outputting the assist light with a wait for a predetermined time after the ON-information or the OFF-information has been obtained from the control circuit 270.

Thus, the assist light control circuit 292 compensates for the delay difference between the optical packet signal input to the multiplexer 140 and the assist light by controlling a delay amount of the assist light. Depending on different physical characteristics such as respective path lengths, however, the assist light may be input to the multiplexer 140 before the optical packet signal if the assist light control circuit 292 outputs the assist light without providing a delay.

In the above case, a delay unit may be disposed to delay, under the control of the control circuit 270, the optical packet signal transmitted to the multiplexer 140. The delay unit causes the assist light to be input to the multiplexer 140 at a later timing than the optical packet signal if the assist light control circuit 292 outputs the assist light without providing a delay. Therefore, the delay difference between the optical packet signal input to the multiplexer 140 and the assist light may be compensated for by the assist light control circuit 292 that controls the delay amount of the assist light.

The timing at which the optical packet signal is input to the multiplexer 140 may differ for each of the wavelength variable transmitters 111 through 113 depending on the physical characteristics, such as respective path lengths between the wavelength variable transmitters 111 through 113 and the multiplexer 120. In view of such a situation, the assist light control circuit 292 stores an optimum delay amount for each of the wavelength variable transmitters 111 through 113.

In that case, the assist light control circuit 292 sets a standby time during which the outputting of the assist light is kept on standby after the ON-information or the OFF-information has been obtained, depending on the delay amount corresponding to one of the wavelength variable transmitters 111 through 113 which has output the ON-information or the OFF-information. The optimum delay amount of the assist light may be set in terms of, e.g., a time (in units of nanosecond), the number of clocks of the CPU in the assist light control circuit 292, or the phase of the assist light.

Figure 3:
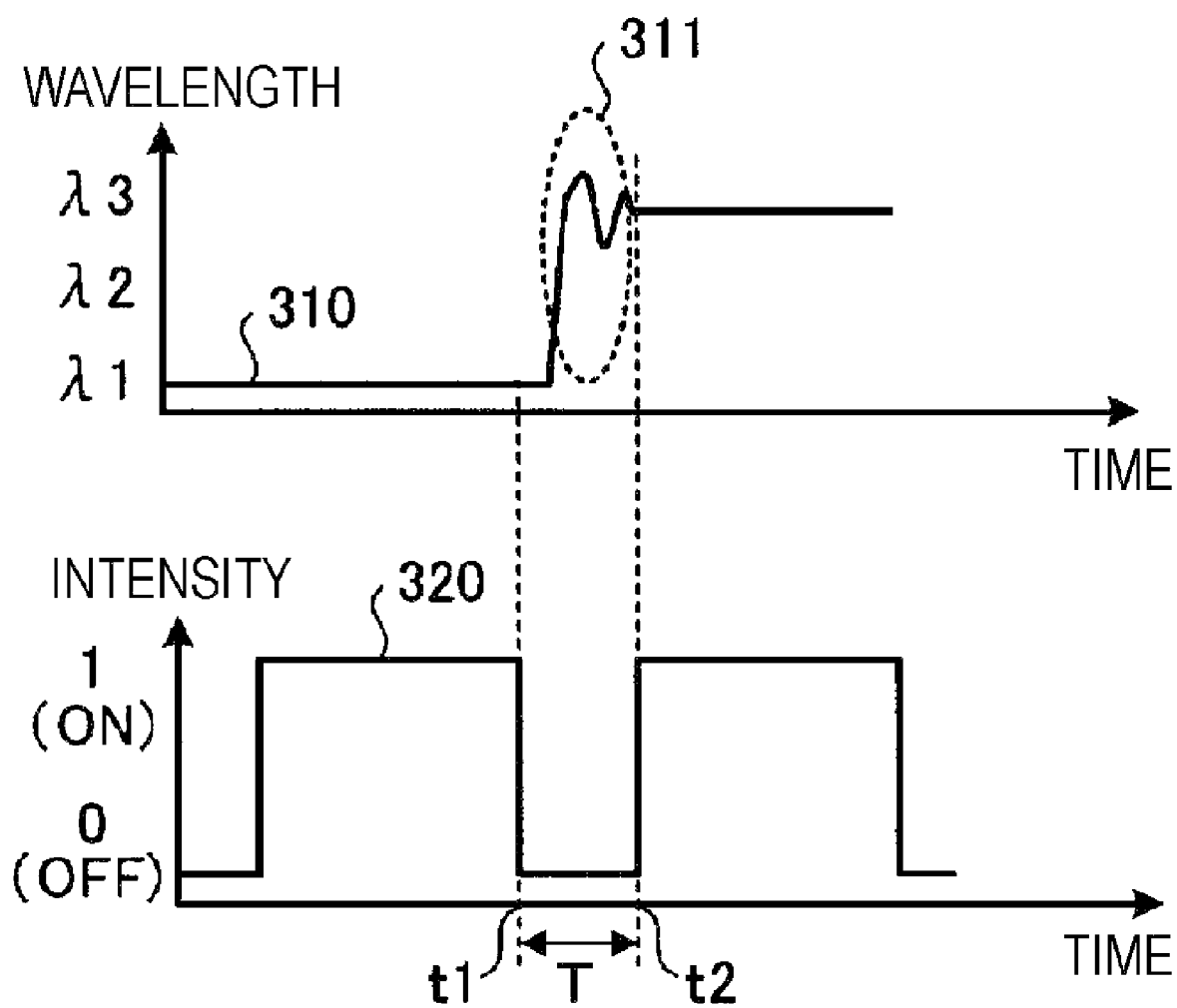
FIG. 3 illustrates block-off of an optical signal by a gate switch illustrated in FIG. 2.

FIG. 3 illustrates block-off of the optical signal by the gate switch illustrated in FIG. 2. In FIG. 3, the horizontal axis represents time. An optical signal 310 represents the optical signal output from the modulator 221. The vertical axis in an upper graph plotting the optical signal 310 represents the wavelength of the optical signal 310. The following description is made of an example in which the control circuit 270 controls the wavelength variable LD 211 such that the wavelength of the optical signal 310 is $\lambda 1$ in a period before a time t1 and the wavelength of the optical signal 310 is $\lambda 3$ in a period after a time t2 later than the time t1.

A period T from the time t1 to t2 is a wavelength switching period in which the wavelength of the optical signal output from the modulator 221 is switched over from $\lambda 1$ to $\lambda 3$. Stated another way, in the period T, the wavelength of the optical signal output from the modulator 221 is switched over from $\lambda 1$ to $\lambda 3$ via $\lambda 2$. Further, in the period T, the wavelength of the optical signal output from the modulator 221 becomes unstable as indicated by reference numeral 311.

An optical signal 320 represents the optical signal output from the gate switch 231. The vertical axis in a lower graph plotting the optical signal 320 represents the intensity (1 or 0) of the optical signal 320. Upon the gate switch 231 being turned on, the optical signal 320 passes through the gate switch 231 and therefore the intensity of the optical signal 320 is 1. Upon the gate switch 231 being turned off, the optical signal 320 is blocked off by the gate switch 231 and therefore the intensity of the optical signal 320 is 0.

The control circuit 270 turns off the gate switch 231 at least during the period T to block off part of the optical signal 310 in which the wavelength of the optical signal becomes $\lambda 2$. Simultaneously, the wavelength of the optical signal 320 is changed from $\lambda 1$ to $\lambda 3$ and the port outputting the optical signal 320 is switched over from the port 161 to 163. Therefore, the optical signal 320 could be avoided from leaking to the port 162, i.e., causing crosstalk, during the switching-over of the port.

Figure 4:
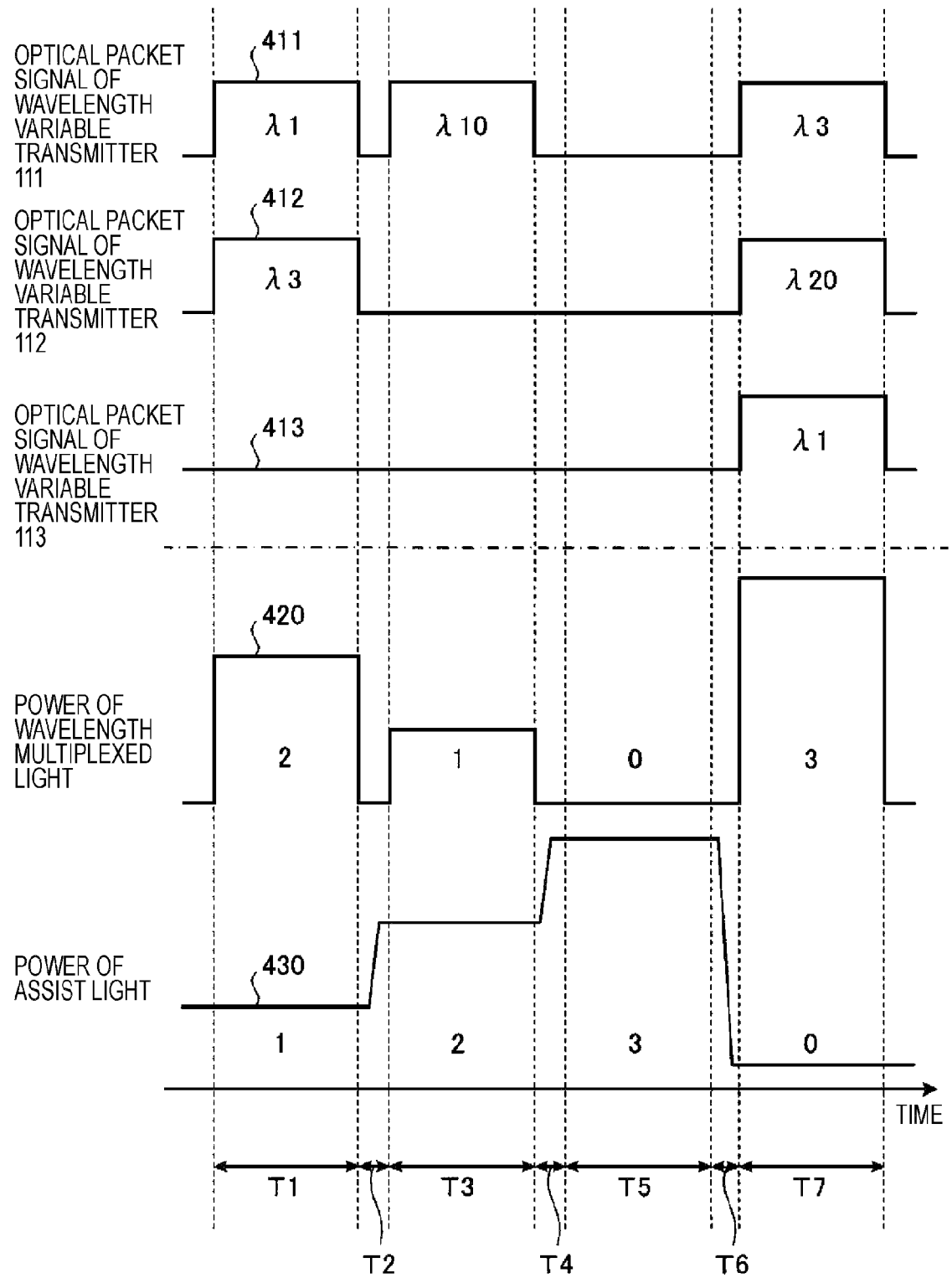
FIG. 4 illustrates power control for assist light by an assist light control circuit illustrated in FIG. 2.

FIG. 4 illustrates power control for the assist light by the assist light control circuit illustrated in FIG. 2. In FIG. 4, the horizontal axis represents time. Periods T1 to T7 set along the horizontal axis are successive periods. For example, waveforms 411 through 413 represent respective waveforms of the optical packet signals output from the wavelength variable transmitters 111 through 113 to the multiplexer 120. Of the periods T1 to T7, the periods T1, T3 and T5 are signal output periods common to the wavelength variable transmitters 111 through 113. In other words, the wavelength variable transmitters 111 through 113 output the optical packet signals in the signal output periods T1, T3 and T5.

Of the periods T1 to T7, the periods T2, T4 and T6 are wavelength switching periods common to the wavelength variable transmitters 111 through 113. In other words, the wavelength variable transmitters 111 through 113 switch over the wavelengths of the optical packet signals in the wavelength switching periods T2, T4 and T6. In the signal output period T1, the wavelength variable transmitter 111 outputs the optical packet signal having the wavelength $\lambda 1$, the wavelength variable transmitter 112 outputs the optical packet signal having the wavelength $\lambda 3$, and the wavelength variable transmitter 113 does not output the optical packet signal.

In the signal output period T3, the wavelength variable transmitter 111 outputs the optical packet signal having a wavelength $\lambda 10$, while the wavelength variable transmitter 112 and the wavelength variable transmitter 113 do not output optical packet signals. In the signal output period T5, all the wavelength variable transmitters 111 through 113 do not output the optical packet signals. In the signal output period T7, the wavelength variable transmitters 111 through 113 output the optical packet signals having the wavelength $\lambda 3$, $\lambda 20$, and $\lambda 1$, respectively.

For example, a waveform 420 represents the waveform of the wavelength multiplexed light output from the multiplexer 120. Power of the wavelength multiplexed light output from the multiplexer 120 is a total sum of powers of the respective optical packet signals output from the wavelength variable transmitters 111 through 113. Assuming that power of one optical packet signal is "1", powers of the wavelength multiplexed lights output from the multiplexer 120 in the signal output periods T1, T3, T5 and T7 are respectively "2", "1", "0", and "3".

A waveform 430 represents the waveform of the assist light output from the assist light output unit 130. Herein, the assist light control circuit 292 controls the power of the assist light output from the LD 291 so that the total sum of the power of the wavelength multiplexed light output from the multiplexer 120 and the power of the assist light becomes "3". In the illustrated case, powers of the assist light output from the LD 291 in the signal output periods T1, T3, T5 and T7 are respectively "1", "2", "3" and "0".

The assist light control circuit 292 previously calculates the powers of the assist light output in the signal output periods T1, T3, T5 and T7 in respective signal output periods before the relevant signal output periods. The following description is made in detail of a timing at which the assist light control circuit 292 calculates the power of the assist light and a timing at which the assist light control circuit 292 changes the power of the assist light output from the LD 291.

In a signal output period (not shown) before the signal output period T1, the assist light control circuit 292 calculates the power ("2" in this embodiment) of the wavelength multiplexed light, which is to be output from the multiplexer 120 in the signal output period T1, based on the ON-information or the OFF-information output from the wavelength variable transmitters 111 through 113. The assist light control circuit 292 further calculates needed power ("1" in this embodiment) of the assist light based on the calculated power of the wavelength multiplexed light. The assist light control circuit 292 changes the power of the assist light output from the LD 291 to "1" in the wavelength switching period immediately before the signal output period T1.

In the signal output period T1, the assist light control circuit 292 previously calculates the power ("1" in this embodiment) of the wavelength multiplexed light, which is to be output from the multiplexer 120 in the signal output period T3, based on the ON-information or the OFF-information output from the wavelength variable transmitters 111 through 113. The assist light control circuit 292 further calculates needed power ("2" in this embodiment) of the assist light based on the calculated power of the wavelength multiplexed light. The assist light control circuit 292 changes the power of the assist light output from the LD 291 to "2" in the wavelength switching period T2 immediately before the signal output period T3.

In the signal output period T3, the assist light control circuit 292 previously calculates the power ("0" in this embodiment) of the wavelength multiplexed light, which is to be output from the multiplexer 120 in the signal output period T5, based on the ON-information or the OFF-information output from the wavelength variable transmitters 111 through 113. The assist light control circuit 292 further calculates needed power ("3" in this embodiment) of the assist light based on the calculated power of the wavelength multiplexed light. The assist light control circuit 292 changes the power of the assist light output from the LD 291 to "3" in the wavelength switching period T4 immediately before the signal output period T5.

In the signal output period T5, the assist light control circuit 292 previously calculates the power ("3" in this embodiment) of the wavelength multiplexed light, which is to be output from the multiplexer 120 in the signal output period T7, based on the ON-information or the OFF-information output from the wavelength variable transmitters 111 through 113. The assist light control circuit 292 further calculates needed power ("0" in this embodiment) of the assist light based on the calculated power of the wavelength multiplexed light. The assist light control circuit 292 changes the power of the assist light output from the LD 291 to "0" in the wavelength switching period T6 immediately before the signal output period T7.

With the process described above, the power of the wavelength multiplexed light output from the multiplexer 140 to the amplifier 150 is stably held constant at "3" at least in the signal output periods T1, T3 and T5. As a result, an optical surge caused in the amplifier 150 could be suppressed.

Figure 5:
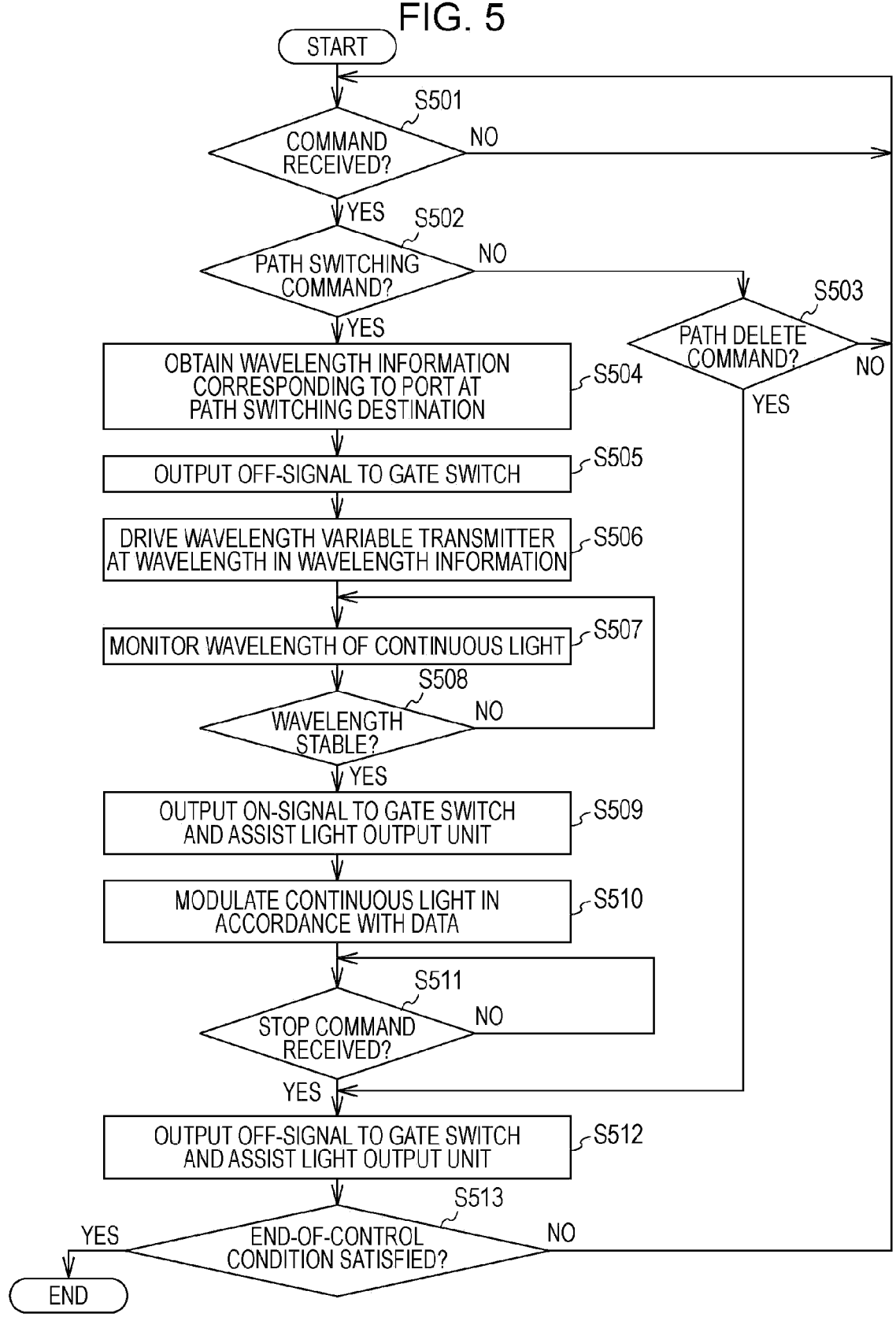
FIG. 5 is a flowchart illustrating one example of operations of a control circuit illustrated in FIG. 2.

FIG. 5 is a flowchart illustrating one example of operations of the control circuit illustrated in FIG. 2. The operation of the wavelength variable transmitter 111 will be described with reference to FIG. 5. As illustrated in FIG. 5, the control circuit 270 first determines whether a command from the packet scheduler 280 is received (operation S501), and waits for reception of the command (operation S501: "No" loop).

If the command is received in operation S501 (operation S501: "Yes"), the control circuit 270 determines whether the command received in operation S501 is a path switching command (operation S502). If the command is not the path switching command (operation S502: "No"), the control circuit 270 determines whether the command received in operation S501 is a path delete command (operation S503).

If the command is not the path delete command in operation S503 (operation S503: "No"), the control circuit 270 returns to operation S501 to continue the process. In this case, various processes are executed in accordance with the received command, but a description of those various processes is omitted here. If the command is the path delete command (operation S503: "Yes"), the control circuit 270 advances to operation S512 to continue the process.

If the command is the path switching command in operation S502 (operation S502: "Yes"), the control circuit 270 obtains wavelength information (one of $\lambda 1$, $\lambda 2$, $\lambda 3$, etc.) corresponding to the port, which is located at the path switching destination, among the ports 161, 162, 163, etc. (operation S504). Then, the control circuit 270 outputs an OFF-signal to the gate switch 231 (operation S505). Then, the control circuit 270 drives the wavelength variable LD 211 (operation S506) at the wavelength of the wavelength information obtained in operation S504.

The control circuit 270 monitors the wavelength of the continuous light output from the wavelength variable LD 211 based on the wavelength information output from the wavelength monitoring circuit 245 (operation S507). Then, the control circuit 270 determines whether the wavelength of the continuous light output from the wavelength variable LD 211 is stable based on the wavelength monitored in operation S507 (operation S508).

If the wavelength of the continuous light is not stable in operation S508 (operation S508: No), the control circuit 270 returns to operation S501 to continue the process. If the wavelength of the continuous light is stable (operation S508: Yes), the control circuit 270 outputs an ON-signal to the gate switch 231 and the assist light output unit 130 (operation S509).

The control circuit 270 controls the modulator 221 to modulate the continuous light output from the wavelength variable LD 211 based on the data accumulated in the data buffer 260 (operation S510). Then, the control circuit 270 determines whether a stop command from the packet scheduler 280 is received (operation S551), and waits for reception of the stop command (operation S511: "No" loop). If the stop command is received (operation S511: "Yes"), the control circuit 270 outputs an OFF-signal to the gate switch 231 and the assist light output unit 130 (operation S512).

The control circuit 270 determines whether an end-of-control condition is satisfied (operation S513). If the end-of-control condition is not satisfied (operation S513: "No"), the control circuit 270 returns to operation S501 to continue the process. If the end-of-control condition is satisfied (operation S513: "Yes"), the control circuit 270 brings the series of operations to an end. The above-described operations may be executed for each of the wavelength variable transmitters 112 and the wavelength variable transmitter 113 under control of the packet scheduler 280 in sync with the wavelength variable transmitter 111.

Figure 6:
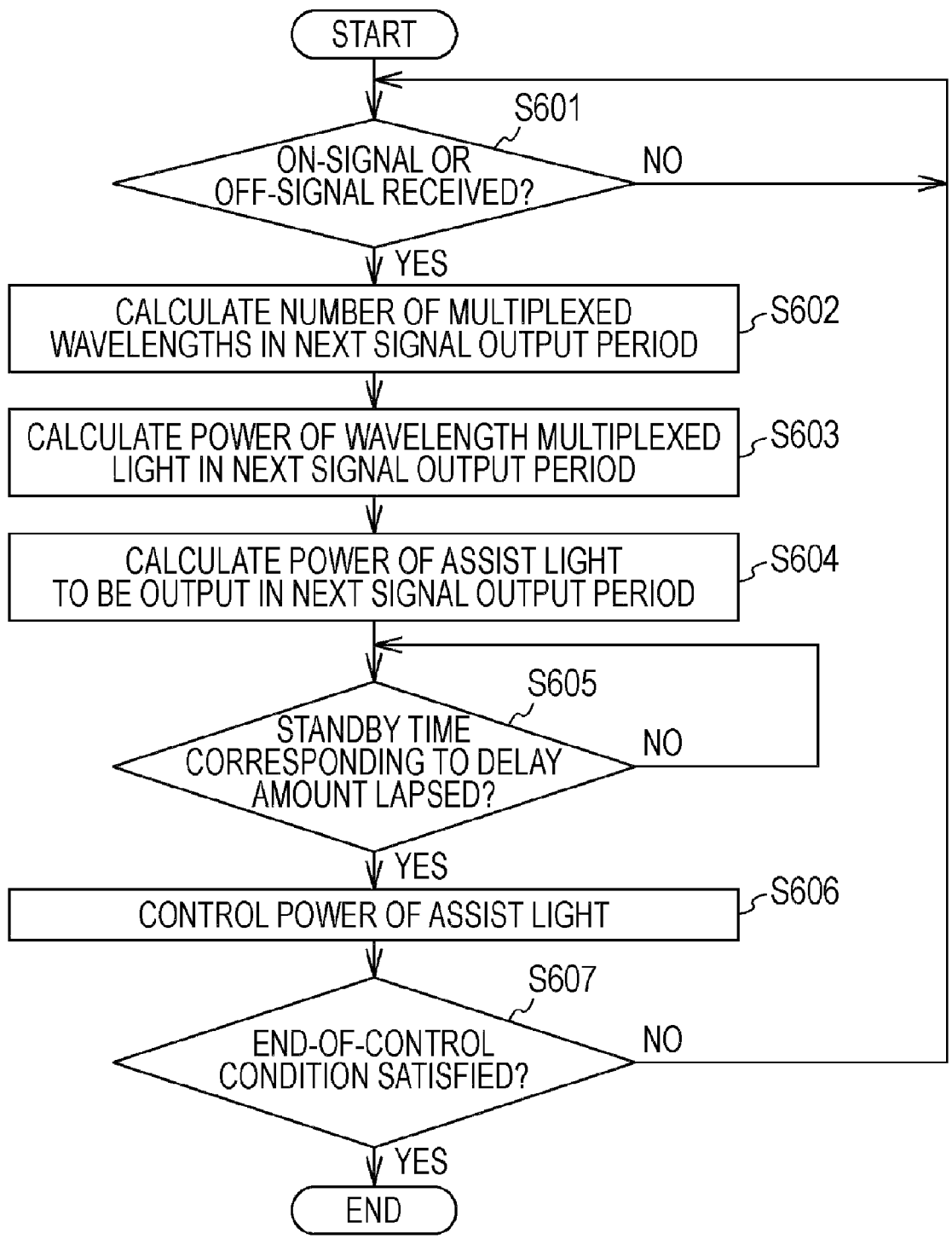
FIG. 6 is a flowchart illustrating one example of operations of the assist light control circuit illustrated in FIG. 2.

FIG. 6 is a flowchart illustrating one example of operations of the assist light control circuit illustrated in FIG. 2. As illustrated in FIG. 6, the assist light control circuit 292 first determines whether an ON-signal or an OFF-signal is received from each of the wavelength variable transmitters 111 through 113 (operation S601), and waits for reception of the ON-signal or the OFF-signal (operation S601: "No" loop).

If the ON-signal or the OFF-signal is received in operation S601 (operation S601: "Yes"), the assist light control circuit 292 calculates the number of multiplexed wavelengths in the wavelength multiplexed light to be output from the multiplexer 120 in the next signal output period based on the received ON-signal or OFF-signal (operation S602). Further, the assist light control circuit 292 calculates the power of the wavelength multiplexed light to be output from the multiplexer 120 in the next signal output period based on the number of multiplexed wavelengths calculated in operation S602 (operation S603).

The assist light control circuit 292 calculates the power of the assist light to be output in the next signal output period based on the power calculated in operation S603 (operation S604). Then, the assist light control circuit 292 determines (in operation S605) whether a standby time corresponding to a preset certain delay amount has lapsed after the reception of the ON-signal or the OFF-signal in operation S601, and waits for the lapse of the standby time (operation S605: "No" loop).

If the standby time has lapsed (operation S605: "Yes"), the assist light control circuit 292 controls the power of the assist light output from the LD 291 based on the power calculated in operation S604 (operation S606). Then, the assist light control circuit 292 determines whether an end-of-control condition is satisfied (operation S607). If the end-of-control condition is not satisfied (operation S607: "No"), the assist light control circuit 292 returns to operation S601 to continue the process. If the end-of-control condition is satisfied (operation S607: "Yes"), the assist light control circuit 292 brings the series of operations to an end.

Thus, with the optical packet switching apparatus 100 of the first embodiment, since the assist light having the dynamically controlled power is wavelength-multiplexed with the wavelength multiplexed light input to the amplifier 150, the power of the wavelength multiplexed light input to the amplifier 150 could be held constant. As a result, an optical surge could be suppressed which may be caused in the amplifier 150 upon change in the number of multiplexed wavelengths in the wavelength multiplexed light input to the amplifier 150. Further, since the optical signal is blocked off by the gate switch 231 during the wavelength switching period, a leakage of the optical packet signal to undesired one(s) of the ports 161, 162, 163, etc., i.e., a crosstalk, could be suppressed.

Since the optical signal is blocked off by the gate switch 231 in an intermittently divided manner, the optical packet signal could be produced with the power of the wavelength variable LD 211 held constant. Therefore, a wavelength variation caused by changes in the power of the wavelength variable LD 211 could be avoided and the path switching control could be stably executed. Thus, by blocking off the optical signal during the wavelength switching period, the optical packet signal could be produced with the power of the continuous light output from the wavelength variable LD 211 held constant.

Since the number of multiplexed wavelengths in the wavelength multiplexed light to be output from the multiplexer 120 is calculated based on the ON/OFF-switching information of the gate switch 231 in each of the wavelength variable transmitters 111 through 113 and the power of the assist light is controlled based on the calculated number of multiplexed wavelengths, the power of the wavelength multiplexed light input to the amplifier 150 could be held constant without providing a part to measure the power of the wavelength multiplexed light output from the multiplexer 120.

While, in the above description, the assist light control circuit 292 previously calculates the number of multiplexed wavelengths in the wavelength multiplexed light to be output from the multiplexer 120 in the next signal output period, calculates the power of the wavelength multiplexed light based on the calculated number of multiplexed wavelengths, and controls the power of the assist light based on the calculated power, the configuration may be modified so as not to calculate the power of the wavelength multiplexed light.

In such a modification, for example, the assist light control circuit 292 stores the power of the assist light, which provides a constant total sum of the power of the wavelength multiplexed light output from the multiplexer 120 and the power of the assist light, corresponding to each number of multiplexed wavelengths. Further, the assist light control circuit 292 calculates the number of multiplexed wavelengths in the wavelength multiplexed light and controls the power of the assist light output from the LD 291 so as to provide the total power corresponding to the calculated number of multiplexed wavelengths.

Second Embodiment

Figure 7:
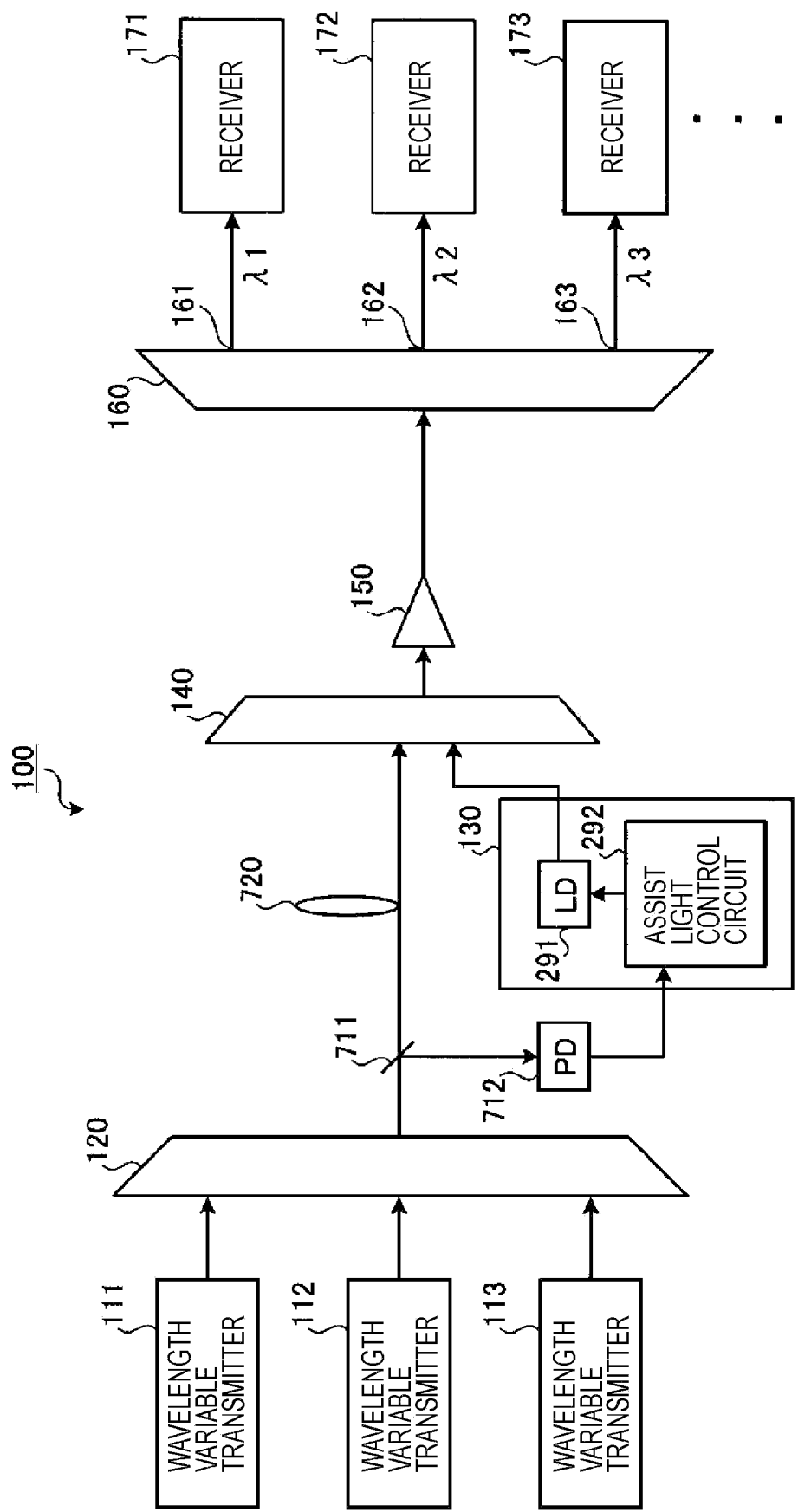
FIG. 7 is a block diagram illustrating the functional configuration of an optical packet switching apparatus of a second embodiment.

FIG. 7 is a block diagram illustrating the functional configuration of an optical packet switching apparatus of a second embodiment. Similar components in FIG. 7 to those in FIGS. 1 and 2 are denoted by the same reference numerals and a description of those components is omitted here. As illustrated in FIG. 7, the optical packet switching apparatus 100 of the second embodiment includes a splitter 711, a PD 712, and a delay unit 720 in addition to the configuration of the optical packet switching apparatus 100 of the first embodiment.

The splitter 711 may be disposed between the multiplexer 120 and the multiplexer 140 (thus providing a splitter). The splitter 711 splits the wavelength multiplexed light output from the multiplexer 120 toward the multiplexer 140 such that the split wavelength multiplexed lights are output to the delay unit 720 and the PD 712. The PD 712 outputs an electrical signal, which corresponds to the power of the wavelength multiplexed light output from the splitter 711, to the assist light output unit 130 (thus providing a monitor).

The assist light control circuit 292 calculates the power of the wavelength multiplexed light output from the multiplexer 120 to the multiplexer 140 based on power of the electrical signal output from the PD 712. The assist light control circuit 292 controls the power of the assist light output from the LD 291 so that a total sum of the calculated power of the wavelength multiplexed light and the power of the assist light output from the LD 291 is held constant.

The delay unit 720 outputs the wavelength multiplexed light output from the splitter 711 to the multiplexer 140 after delaying the wavelength multiplexed light by a certain time (thus providing a delayer). A time from the outputting of the wavelength multiplexed light from the splitter 711 to the delay unit 720 to the inputting of the same wavelength multiplexed light to the multiplexer 140 is assumed to be Ta. A time from the outputting of the wavelength multiplexed light from the splitter 711 to the PD 712 to the inputting of the assist light, which is output from the assist light output unit 130 without a delay corresponding to the same wavelength multiplexed light, to the multiplexer 140 is assumed to be Tb. A delay amount provided by the delay unit 720 is set such that the time Ta is equal to or longer than the time Tb.

The delay unit 720 is, for example, an optical fiber. In this case, the delay amount provided by the delay unit 720 may be set depending on a length of the optical fiber. In response to the time Ta being longer than the time Tb, the assist light control circuit 292 sets, to a time difference (Ta−Tb), an amount of delay from receiving the electrical signal output from the PD 712 to the outputting of the assist light. Setting the delay amount could compensate for a delay difference between the wavelength multiplexed light input to the multiplexer 140 from the splitter 711 through the delay unit 720 and the assist light input to the multiplexer 140 from the assist light output unit 130.

Thus, with the optical packet switching apparatus 100 of the second embodiment, as with the optical packet switching apparatus 100 of the first embodiment, the power of the wavelength multiplexed light input to the amplifier 150 could be held substantially constant and an optical surge could be suppressed which may be caused in the amplifier 150 upon change in the number of multiplexed wavelengths in the wavelength multiplexed light input to the amplifier 150.

Further, since the optical signal is blocked off by the gate switch 231 during the wavelength switching period, a leakage of the optical packet signal to undesired one(s) of the ports 161, 162, 163, etc., i.e., a crosstalk, could be suppressed. Since the optical signal is blocked off by the gate switch 231 in an intermittently divided manner, the optical packet signal could be produced with the power of the continuous light output from the wavelength variable LD 211 held constant, while the optical signal is blocked off during the wavelength switching period.

Since the number of multiplexed wavelengths in the wavelength multiplexed light to be output from the multiplexer 120 is calculated based on the power monitored by using the splitter 711 and the PD 712 and the power of the assist light is controlled based on the calculated number of multiplexed wavelengths, the power of the wavelength multiplexed light input to the amplifier 150 could be held constant with a closed simple configuration within an interconnected section made up of the multiplexer 120, the multiplexer 140, and the demultiplexer 160.

While, in the above description, the assist light control circuit 292 calculates the number of multiplexed wavelengths in the wavelength multiplexed light based on the power of the electrical signal output from the PD 712, calculates the power of the wavelength multiplexed light based on the calculated number of multiplexed wavelengths, and controls the power of the assist light based on the calculated power, the configuration may be modified so as not to calculate the power of the wavelength multiplexed light.

In such a modification, for example, the assist light control circuit 292 stores the power of the assist light, which provides a constant total sum of the power of the wavelength multiplexed light output from the multiplexer 120 and the power of the assist light, corresponding to each level of power of the electrical signal output from the PD 712. Further, the assist light control circuit 292 controls the power of the assist light output from the LD 291 so as to provide the power corresponding to the power of the electrical signal output from the PD 712.

Third Embodiment

Figure 8:
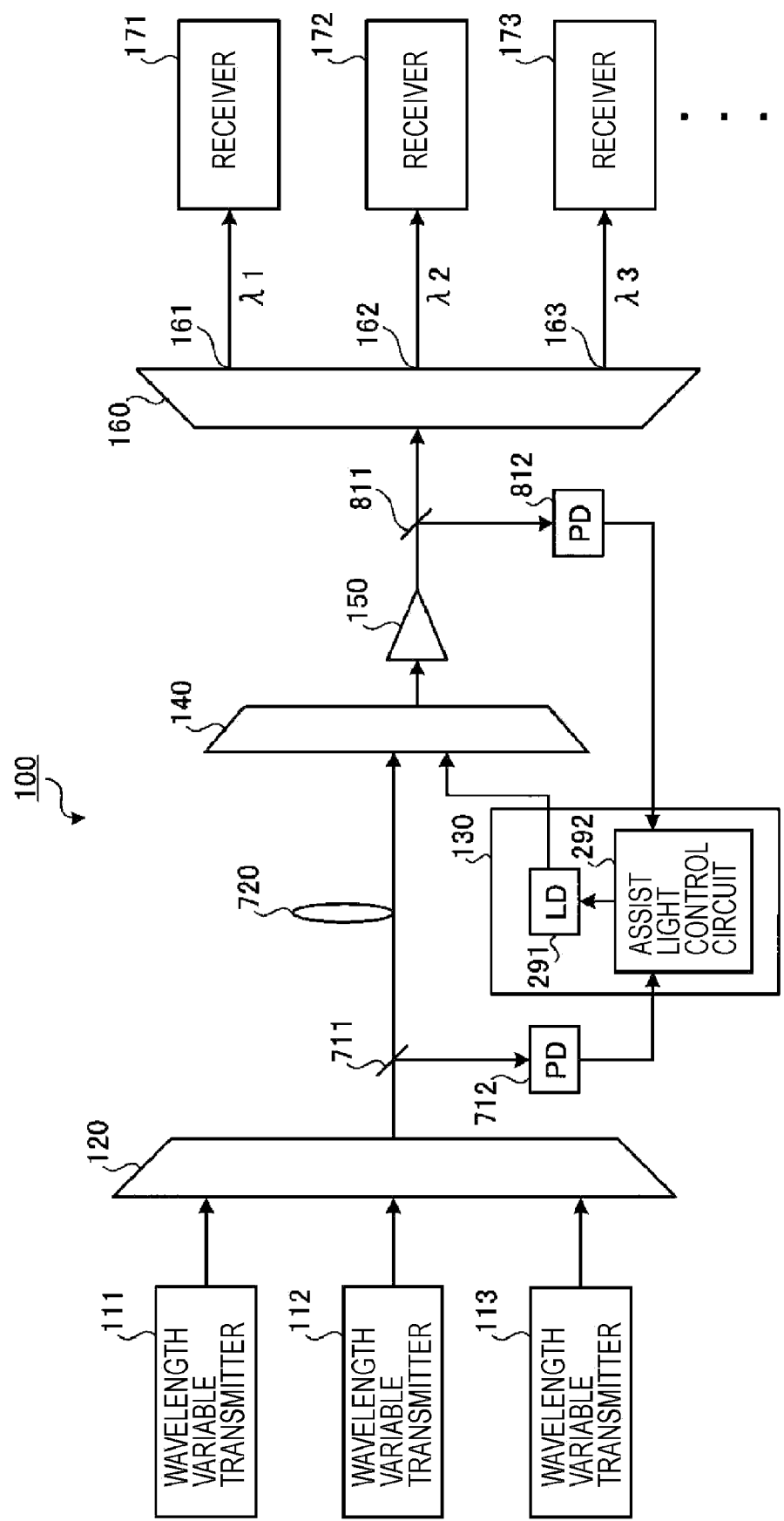
FIG. 8 is a block diagram illustrating the functional configuration of an optical packet switching apparatus of a third embodiment.

FIG. 8 is a block diagram illustrating the functional configuration of an optical packet switching apparatus of a third embodiment. Similar components in FIG. 8 to those in FIG. 7 are denoted by the same reference numerals and a description of those components is omitted here. As illustrated in FIG. 8, the optical packet switching apparatus 100 of the third embodiment includes a splitter 811 and a PD 812 in addition to the configuration of the optical packet switching apparatus 100 of the second embodiment. Before the optical packet signal is transmitted, the optical packet switching apparatus 100 performs a calibration to set an optimum delay amount of the assist light.

The splitter 811 and the PD 812 provide a second monitor for monitoring the power of the wavelength multiplexed light with which the assist light has been wavelength-multiplexed by the multiplexer 140. More specifically, the splitter 811 may be disposed between the amplifier 150 and the demultiplexer 160. The splitter 811 splits the wavelength multiplexed light output from the amplifier 150 toward the demultiplexer 160 such that the split wavelength multiplexed lights are output to the demultiplexer 160 and the PD 812, respectively.

The PD 812 outputs an electrical signal, which corresponds to the power of the wavelength multiplexed light output from the splitter 811, to the assist light output unit 130. In a calibration before starting to transmit the optical packet signal, each of the wavelength variable transmitters 111 through 113 outputs an optical signal in a fixed pattern. In the calibration, the assist light control circuit 292 of the assist light output unit 130 controls the LD 291 so as to output the assist light in a pattern reversal to that of the optical signal output from each of the wavelength variable transmitters 111 through 113.

Further, the assist light control circuit 292 sets an optimum delay amount of the assist light output in the transmission of the optical packet signal based on the electrical signal output from the PD 812. More specifically, the assist light control circuit 292 obtains a variation of the power indicated by the electrical signal output from the PD 812 while changing the delay amount of the assist light in the reversed pattern. The assist light control circuit 292 temporarily sets the delay amount of the assist light at which the obtained variation is minimized, and sets, as the optimum delay amount of the assist light output in the transmission of the optical packet signal, a delay amount resulting from shifting the temporarily set delay amount through a half cycle.

Figure 9:
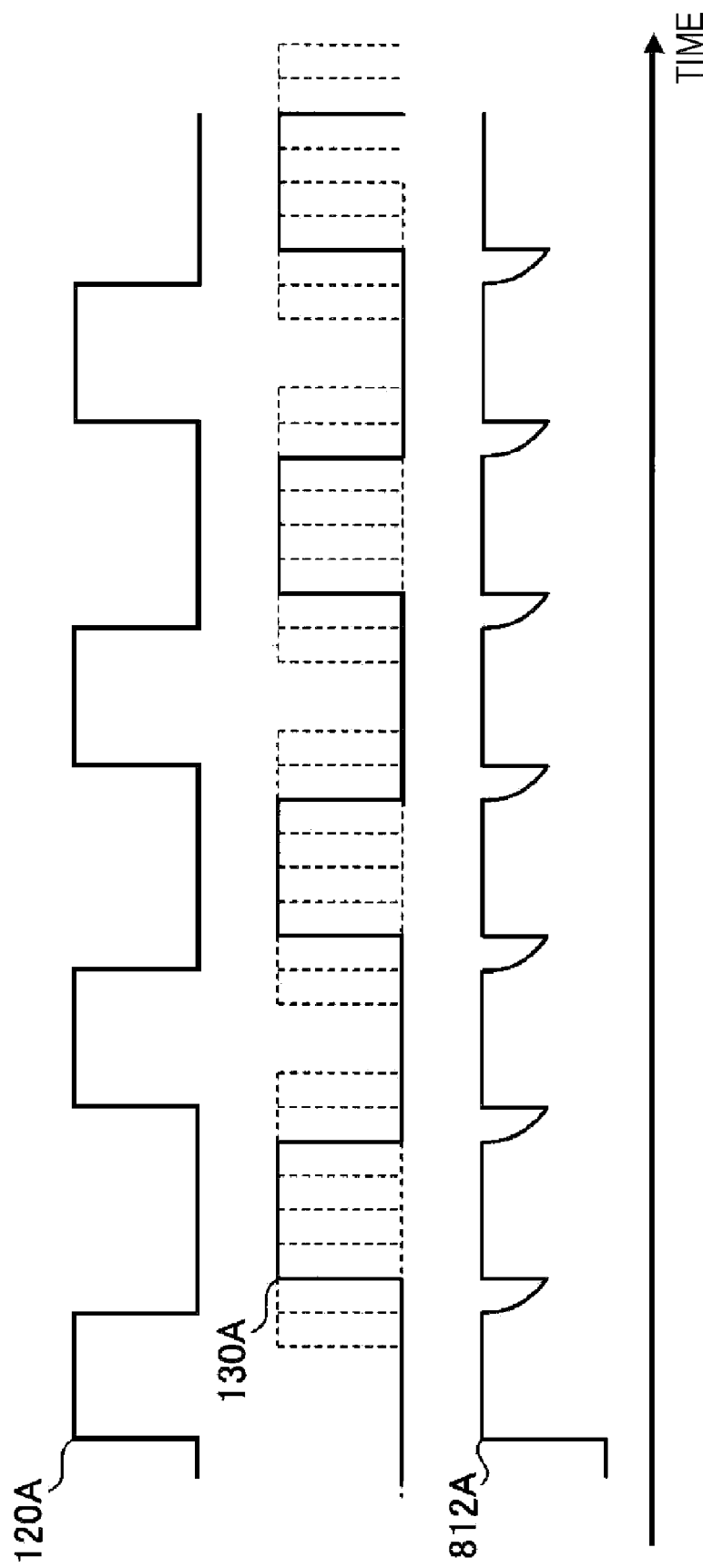
FIG. 9 illustrates a calibration for the optical packet switching apparatus illustrated in FIG. 7.

FIG. 9 illustrates the calibration for the optical packet switching apparatus illustrated in FIG. 7. In FIG. 9, the horizontal axis represents time. The calibration is performed in each of the wavelength variable transmitters 111 through 113. The calibration for the wavelength variable transmitter 111 will be described below. The wavelength variable transmitter 111 is assumed to output an optical signal in an alternating fixed pattern of "1, 0, 1, 0, . . . ". At this time, the wavelength variable transmitter 112 and the wavelength variable transmitter 113 output no optical signals.

A waveform 120A indicates the waveform of the wavelength multiplexed light output from the multiplexer 120 to the multiplexer 140 through the delay unit 720. At this time, because the wavelength variable transmitter 112 and the wavelength variable transmitter 113 output no optical signals, light indicated by the waveform 120A is the same as the optical signal in the alternating fixed pattern output from the wavelength variable transmitter 111.

A waveform 130A indicates the waveform of the assist light in the reversed pattern, which is output from the assist light output unit 130 to the multiplexer 140 through the delay unit 720. At this time, the assist light output unit 130 outputs the optical signal in a reversed alternating pattern of "0, 1, 0, 1, . . . ", which is obtained by reversing the optical signal output from the wavelength variable transmitter 111. A waveform 812A indicates the waveform of the electrical signal output from the PD 812. The waveform of the electrical signal indicated by the waveform 812A is a superimposed waveform of the optical signal input to the multiplexer 140 (i.e., the waveform 120A) and the assist light (i.e., the waveform 130A).

Upon the assist light control circuit 292 changing the delay amount of the assist light, the waveform 130A is changed in the direction of the horizontal axis relative to the waveform 120A. If the waveform 130A takes a state indicated by a solid line in FIG. 9, the assist light indicated by the waveform 130A takes a state completely reversed from the optical signal indicated by the waveform 120A, and a variation in the power of the electrical signal indicated by the waveform 812A is minimized.

The assist light control circuit 292 temporarily sets the delay amount of the assist light indicated by the waveform 130A at that time. By further shifting the temporarily set delay amount through a half cycle, the assist light indicated by the waveform 130A comes into the state completely matched with the optical signal indicated by the waveform 120A. Therefore, the delay difference between the wavelength multiplexed light input to the multiplexer 140 from the splitter 711 through the delay unit 720 and the assist light input to the multiplexer 140 from the assist light output unit 130 could be compensated for.

Figure 10:
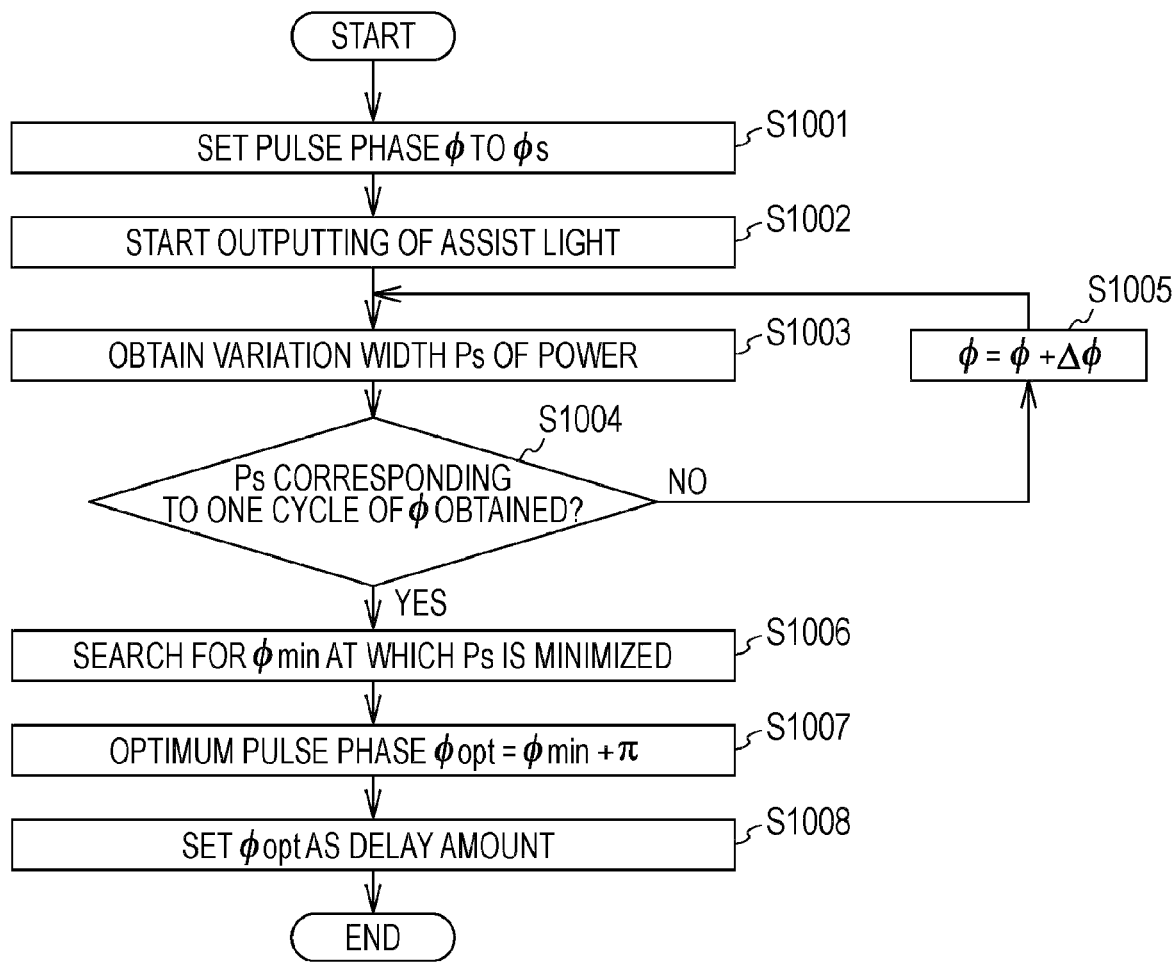
FIG. 10 is a flowchart illustrating one example of operations of an assist light control circuit illustrated in FIG. 8.

FIG. 10 is a flowchart illustrating one example of operations of the assist light control circuit illustrated in FIG. 8. Herein, the delay amount of the assist light is represented by a pulse phase φ of the assist light. First, in the state that the wavelength variable transmitter 111 is transmitting the optical signal in the fixed pattern, the assist light control circuit 292 sets the pulse phase φ of the assist light, which is output from the LD 291, to an initial value φs (operation S1001).

The assist light control circuit 292 starts outputting of the assist light with the pulse phase φ set in operation S1001 (operation S1002). Then, the assist light control circuit 292 obtains a variation width Ps of the power of the electrical signal output from the PD 812 (operation S1003). Then, the assist light control circuit 292 determines (in operation S1004) whether the variation width Ps corresponding to one cycle of the pulse phase φ has been obtained in operation S1003.

If the determination in operation S1004 indicates that the variation width Ps corresponding to one cycle of the pulse phase φ is not yet obtained (operation S1004: No), the assist light control circuit 292 changes the pulse phase φ by a unit change amount Δφ (operation S1005) and then returns to operation S1003 to continue the process. If the variation width Ps corresponding to one cycle of the pulse phase φ is already obtained (operation S1004: Yes), the assist light control circuit 292 searches for, among the pulse phases φ successively set in operation S1005, a pulse phase φmin at which the variation width Ps obtained in operation S1003 is minimized (operation S1006).

The assist light control circuit 292 calculates, as an optimum pulse phase φopt, (φmin+π) (in operation S1007) resulting from shifting φmin through a half cycle, which has been searched for in operation S1006. Then, the assist light control circuit 292 sets the optimum pulse phase φopt, which has been calculated in operation S1007, as the delay amount for the wavelength variable transmitter 111 (operation S1008). The series of operations is thereby brought to an end.

By similarly executing the above-described operations for each of the wavelength variable transmitter 112 and the wavelength variable transmitter 113, the assist light control circuit 292 sets the delay amount for each of the wavelength variable transmitters 111 through 113. If the pulse phase φopt (0≦φopt<2π) is practically set as the delay amount, the pulse phase φopt may be set after the phase has been converted to, e.g., a delay time or the number of delay clocks.

Figure 11:
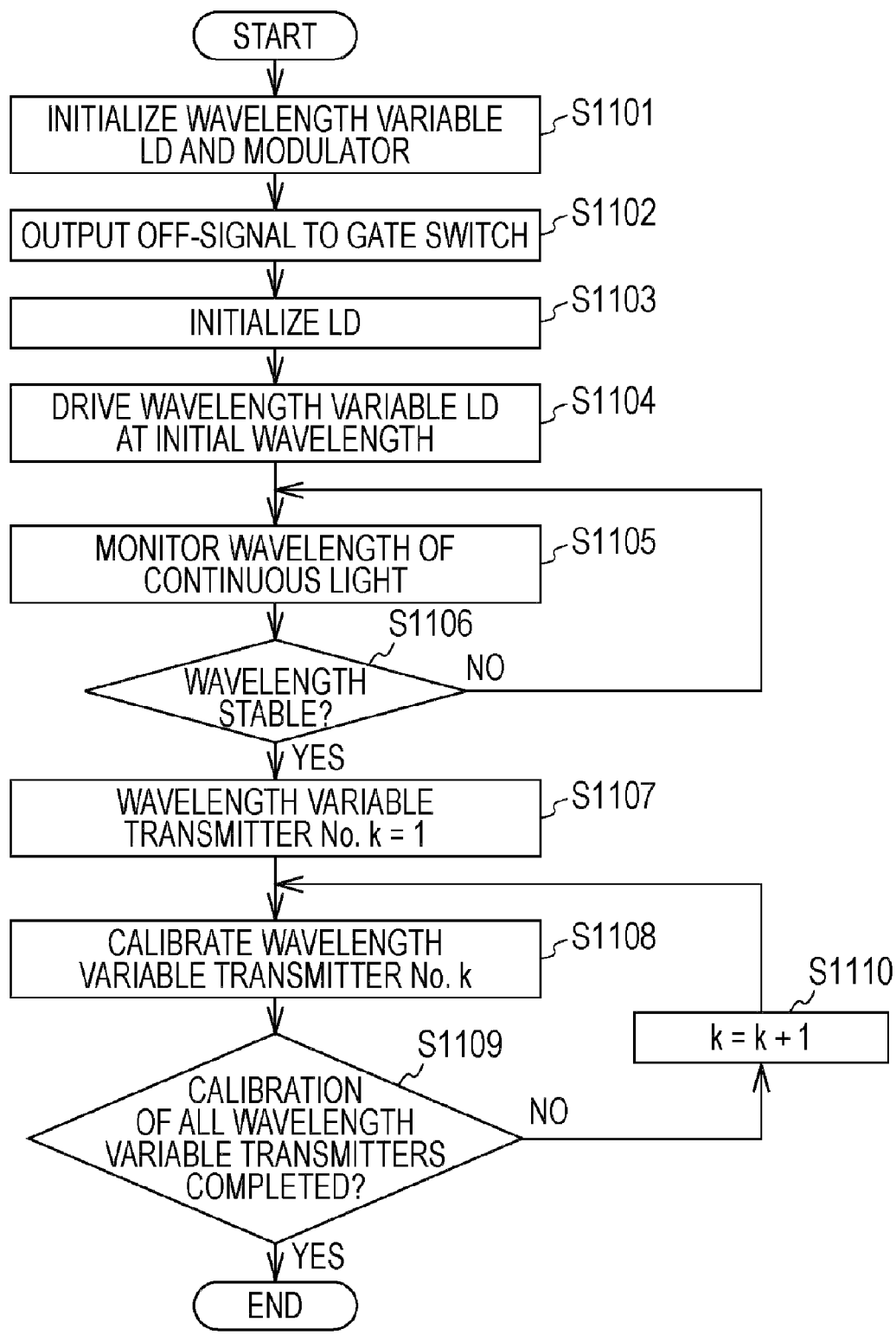
FIG. 11 is a flowchart illustrating one example of operations for driving the optical packet switching apparatus illustrated in FIG. 8.

FIG. 11 is a flowchart illustrating one example of operations for driving the optical packet switching apparatus illustrated in FIG. 8. First, as illustrated in FIG. 11, the control circuit 270 in each of the wavelength variable transmitters 111 through 113 initializes both the wavelength variable LD 211 and the modulator 221 (operation S1101). The initialization executed in operation S1101 includes, e.g., startup and initialization of the wavelength variable LD 211 and the modulator 221, and temperature control of the wavelength variable LD 211.

The control circuit 270 outputs an OFF-signal to the gate switch 231 (operation S1102). Then, the assist light control circuit 292 initializes the LD 291 (operation S1103). The initialization executed in operation S1103 includes, e.g., startup, initialization and temperature control of the LD 291. Then, the control circuit 270 drives the wavelength variable LD 211 at an initial wavelength (operation S1104).

The control circuit 270 monitors the wavelength of the continuous light output from the wavelength variable LD 211 based on the wavelength information output from the wavelength monitoring circuit 245 (operation S1105). Then, the control circuit 270 determines whether the wavelength of the continuous light output from the wavelength variable LD 211 is stable based on the wavelength monitored in operation S1105 (operation S1106).

If the wavelength of the continuous light is not stable in operation S1106 (operation S1106: No), the control circuit 270 returns to operation S1105 to continue the process. If the wavelength of the continuous light is stable (operation S1106: Yes), the control circuit 270 sets, to 1, the wavelength variable transmitter No. k for which a calibration is to be executed among the wavelength variable transmitters 111 through 113 (operation S1107).

The calibration is executed on one of the wavelength variable transmitters 111 through 113 (operation S1108), which corresponds to the set No. k. Details of the calibration executed in operation S1108 are as illustrated in FIG. 10. Then, the control circuit 270 determines whether the calibration has been completed for all of the wavelength variable transmitters 111 through 113 (operation S1109).

If the determination in operation S1109 indicates that the calibration is not yet completed for all of the wavelength variable transmitters (operation S1109: No), the control circuit 270 changes the No. k of the wavelength variable transmitter, on which the calibration is to be executed, to (k+1) (operation S1110) and returns to operation S1108 to continue the process. If the calibration has been completed for all of the wavelength variable transmitters (operation S1109: Yes), the control circuit 270 brings the series of operations to an end and starts the operation of the optical packet switching apparatus 100. For example, the operations illustrated in FIGS. 5 and 6 are started.

Thus, the optical packet switching apparatus 100 of the third embodiment provides similar advantages to those of the optical packet switching apparatus 100 of the second embodiment. Further, the delay amount of the assist light optimum to compensate for the delay difference between the wavelength multiplexed light and the assist light both input to the multiplexer 140 could be set by changing the delay amount of the assist light in the reversed pattern while the power of the wavelength multiplexed light input to the multiplexer 140 is monitored.

While the third embodiment has been described above as disposing the splitter 811 between the amplifier 150 and the demultiplexer 160, the splitter 811 may be disposed at an arbitrary position downstream of the multiplexer 140. For example, the splitter 811 may be disposed between the multiplexer 140 and the amplifier 150.

While the third embodiment has been described above as disposing the splitter 811 and the PD 812 in addition to the configuration of the optical packet switching apparatus 100 of the second embodiment, the splitter 811 and the PD 812 may be disposed in addition to the configuration of the optical packet switching apparatus 100 of the first embodiment illustrated in FIG. 2. In the latter case, the assist light control circuit 292 executes the calibration in a similar manner to that described above in this third embodiment.

Further, while the third embodiment has been described above as outputting the optical signal in the alternating fixed pattern of "1, 0, 1, 0, . . ." from the wavelength variable transmitter 111, the fixed pattern of the optical signal output from the wavelength variable transmitter 111 is not limited to an alternating pattern and may be an arbitrarily preset pattern. The reversed fixed pattern of the assist light output from the assist light output unit 130 is set to the pattern obtained by reversing the fixed pattern of the optical signal.

EXAMPLES

Figure 12:
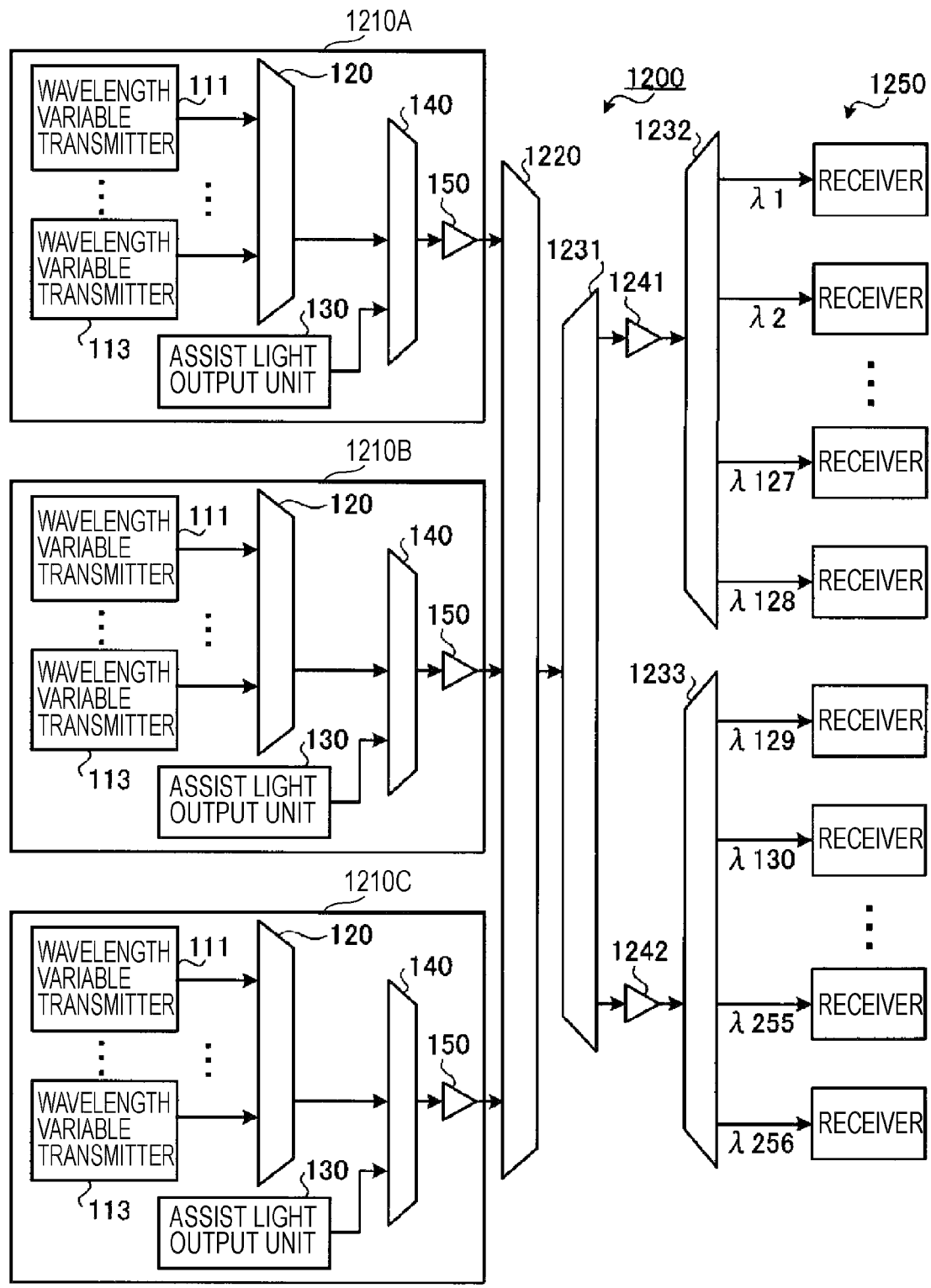
FIG. 12 is a block diagram illustrating the configuration of an optical packet switching apparatus of Example 1.

FIG. 12 is a block diagram illustrating the configuration of an optical packet switching apparatus of Example 1. Similar components in FIG. 12 to those in FIG. 1 are denoted by the same reference numerals and a description of those components is omitted here. As illustrated in FIG. 12, the optical packet switching apparatus 1200 of Example 1 includes a plurality of a wavelength multiplexed light transmitting units 1210A to 1210C, a multiplexer 1220, demultiplexers 1231 to 1233, amplifiers 1241 and 1242, and a receiver group 1250.

Each of the wavelength multiplexed light transmitting units 1210A to 1210C includes the multiplexer 120, the assist light output unit 130, the multiplexer 140, and the amplifier 150, which are illustrated in FIG. 1. The amplifier 150 in each of the wavelength multiplexed light transmitting units 1210A to 1210C outputs the amplified wavelength-multiplexed light to the multiplexer 1220. The multiplexer 1220 multiplexes the respective wavelength multiplexed lights output from the wavelength multiplexed light transmitting units 1210A to 1210C and outputs the resulting wavelength multiplexed light to the demultiplexer 1231.

The demultiplexer 1231 separates the wavelength multiplexed light, which is output from the multiplexer 1220, per band (for each of, e.g., a C-band and an L-band) and outputs the wavelength multiplexed lights separated per band to the demultiplexer 1232 and the demultiplexer 1233. In this example, the demultiplexer 1231 outputs the wavelength multiplexed light covering wavelengths λ1 to λ128 to the demultiplexer 1232 and the wavelength multiplexed light covering wavelengths λ129 to λ256 to the demultiplexer 1233.

The amplifier 1241 may be disposed in a stage upstream of the demultiplexer 1232. The amplifier 1241 amplifies the wavelength multiplexed light output from the demultiplexer 1231 to the demultiplexer 1232. The amplification band of the amplifier 1241 is set, for example, to a band including the wavelengths λ1 to λ128. The amplifier 1242 may be disposed in a stage upstream of the demultiplexer 1233. The amplifier 1242 amplifies the wavelength multiplexed light output from the demultiplexer 1231 to the demultiplexer 1233. The amplification band of the amplifier 1242 is set, for example, to a band including the wavelengths λ129 to λ256.

The demultiplexer 1232 demultiplexes the wavelength multiplexed light output from the demultiplexer 1231. The demultiplexer 1232 has 128 ports. The ports of the demultiplexer 1232 correspond respectively to the wavelengths λ1 to λ128 (λ1<λ2< . . . <λ127<λ128). The demultiplexer 1232 outputs the demultiplexed optical packet signals from the respective ports corresponding to those wavelengths.

The demultiplexer 1233 demultiplexes the wavelength multiplexed light output from the demultiplexer 1231. The demultiplexer 1233 has 128 ports. The ports of the demultiplexer 1233 correspond respectively to the wavelengths λ129 to λ256 (λ129<λ130< . . . <λ255<λ256). The demultiplexer 1233 outputs the demultiplexed optical packet signals from the respective ports corresponding to those wavelengths.

The receiver group 1250 may be made up of 256 receivers corresponding to the wavelengths λ1 to λ256. The optical packet signals output from the demultiplexer 1232 and the demultiplexer 1233 are received by the receivers in the receiver group 1250 corresponding to the respective wavelengths. A stage downstream of the demultiplexers 1232 and 1233 is not limited to the receiver group 1250. For example, if the optical packet switching apparatus 1200 were used as a path changing-over switch in an optical transmission line, the ports of the demultiplexers 1232 and 1233 may be connected respectively to optical fibers which provide different paths.

If the plural multiplexers 120, 140 and 1220 were arranged in multiple stages and the amplifier 150 for amplifying the wavelength multiplexed light obtained with the wavelength multiplexing performed by each multiplexer is disposed in plural as in this example, the assist light output unit 130 and the multiplexer 140 making up the assister may be disposed in a stage upstream of each amplifier 150. Such an arrangement could suppress an optical surge caused in each amplifier 150 of the optical packet switching apparatus 1200.

Figure 13:
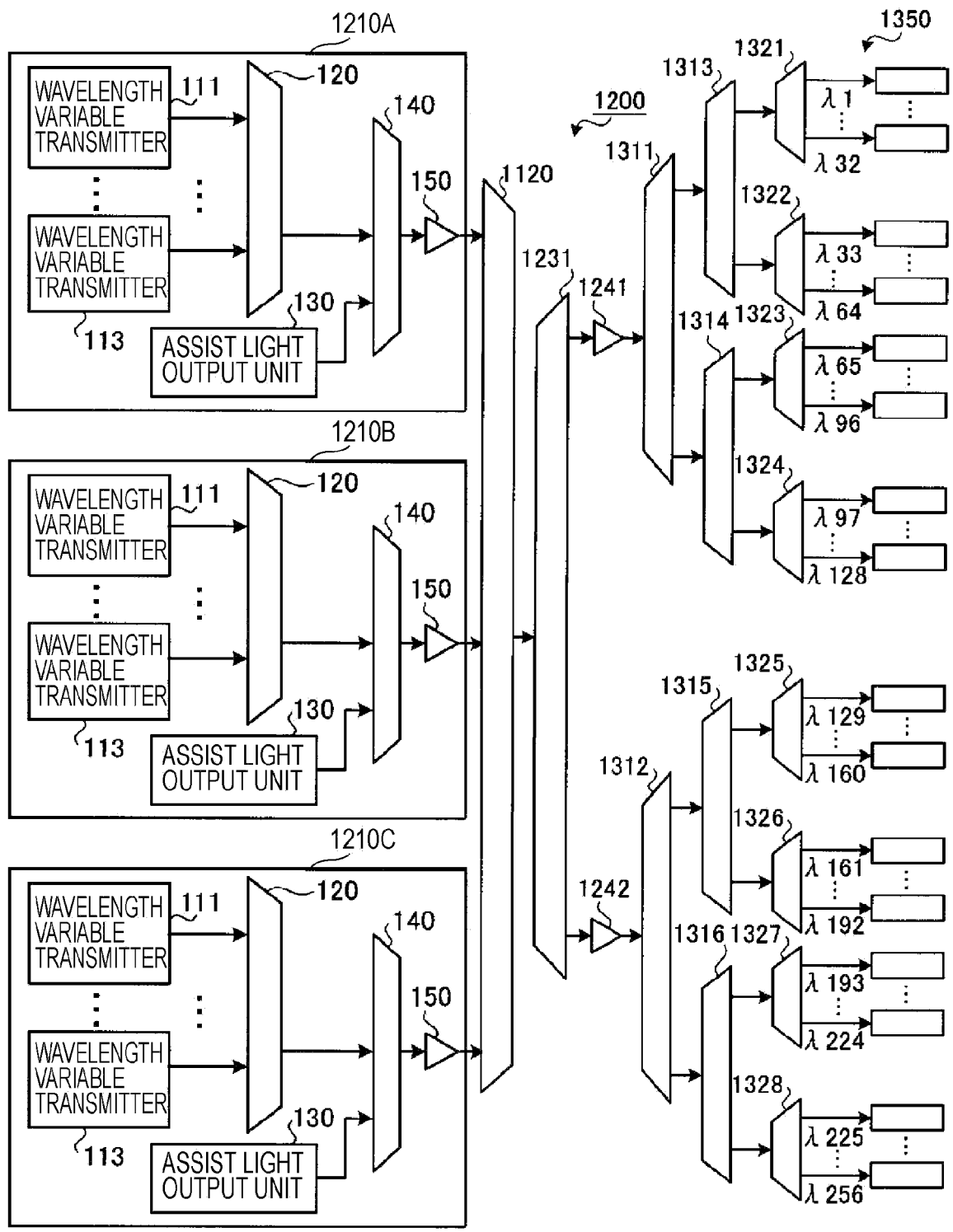
FIG. 13 is a block diagram illustrating the configuration of an optical packet switching apparatus of Example 2.

FIG. 13 is a block diagram illustrating the configuration of an optical packet switching apparatus of Example 2. Similar components in FIG. 13 to those in FIG. 12 are denoted by the same reference numerals and a description of those components is omitted here. The optical packet switching apparatus 1200 of Example 2 includes interleavers 1311 to 1316 and demultiplexers 1321 to 1328 instead of the demultiplexers 1232 and 1233 in the optical packet switching apparatus 1200 of Example 1.

The demultiplexer 1231 outputs the wavelength multiplexed light covering wavelengths λ1 to λ128 to the interleaver 1311 and outputs the wavelength multiplexed light covering wavelengths λ129 to λ256 to the interleaver 1312. The interleaver 1311 demultiplexes the wavelength multiplexed light output from the demultiplexer 1231, and then outputs the wavelength multiplexed light covering the wavelengths λ1 to λ64 to the interleaver 1313 and the wavelength multiplexed light covering the wavelengths λ65 to λ128 to the interleaver 1314.

The interleaver 1313 demultiplexes the wavelength multiplexed light output from the interleaver 1311, and then outputs the wavelength multiplexed light covering the wavelengths λ1 to λ32 to the demultiplexer 1321 and the wavelength multiplexed light covering the wavelengths λ33 to λ64 to the demultiplexer 1322. The interleaver 1314 demultiplexes of the wavelength multiplexed light output from the interleaver 1311, and then outputs the wavelength multiplexed light covering the wavelengths λ65 to λ96 to the demultiplexer 1323 and the wavelength multiplexed light covering the wavelengths λ97 to λ128 to the demultiplexer 1324.

The interleaver 1312 demultiplexes the wavelength multiplexed light output from the demultiplexer 1231, and then outputs the wavelength multiplexed light covering the wavelengths λ129 to λ192 to the interleaver 1315 and the wavelength multiplexed light covering the wavelengths λ193 to λ256 to the interleaver 1316.

The interleaver 1315 demultiplexes the wavelength multiplexed light output from the interleaver 1312, and then outputs the wavelength multiplexed light covering the wavelengths λ129 to λ160 to the demultiplexer 1325 and the wavelength multiplexed light covering the wavelengths λ161 to λ192 to the demultiplexer 1326. The interleaver 1316 demultiplexes the wavelength multiplexed light output from the interleaver 1312, and then outputs the wavelength multiplexed light covering the wavelengths λ193 to λ224 to the demultiplexer 1327 and the wavelength multiplexed light covering the wavelengths λ225 to λ256 to the demultiplexer 1328.

The demultiplexer 1321 demultiplexes the wavelength multiplexed light output from the interleaver 1313. The demultiplexer 1321 has 32 ports. The ports of the demultiplexer 1321 correspond respectively to the wavelengths λ1 to λ32. The demultiplexer 1321 outputs the demultiplexed optical packet signals from the respective ports corresponding to those wavelengths.

Each of the other demultiplexer 1322 to 1328 also has the same configuration as the demultiplexer 1321. The ports of each of the demultiplexers 1322 to 1328 correspond respectively to the wavelengths λ33 to λ64, λ65 to λ96, λ97 to λ128, λ129 to λ160, λ161 to λ192, λ193 to λ224, and λ225 to λ256. The optical packet signals output from the demultiplexer 1321 to 1328 are received by the receivers in the receiver group 1250 corresponding to the respective wavelengths.

With the above-described configuration of each Example, since the assist light having dynamically controlled power is wavelength-multiplexed with the wavelength multiplexed light input to the amplifier, the power of the wavelength multiplexed light input to the amplifier could be held constant. Therefore, even upon change in the number of multiplexed wavelengths in the wavelength multiplexed light input to the amplifier, an optical surge caused in the amplifier could be suppressed.

Further, each of the plural transmitters described above is needed to include a producer for producing an optical signal having a variable wavelength, and a gate switch for blocking off the optical signal produced by the producer in the wavelength switching period of the optical signal.

With the configuration of each Example, since the optical signal is blocked off by the gate switch during the wavelength switching period, a leakage of the optical packet signal to undesired one(s) of the ports, i.e., a crosstalk, could be suppressed.

While the embodiments of the disclosure and the advantages of the embodiments have been fully described above, those skilled in the art could implement various changes, additions, and omissions without departing the spirit and the scope of the present invention defined in claims.

With the disclosed optical packet switching apparatus and optical packet switching method, as described above, the optical surge and the crosstalk could be suppressed in a wavelength-selective optical switching apparatus. As a result, a wavelength-selective (N×N) optical switching apparatus could be realized. Hence, a significant reduction in the apparatus size and cost could be achieved in comparison with those of the delivery/coupling optical switching apparatus.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical packet switching apparatus comprising:
a plurality of transmitters for transmitting optical packet signals having wavelengths;
a multiplexer for multiplexing the optical packet signals transmitted by the plurality of transmitters;
a packet scheduler controlling a timing at which each of the transmitters transmits the optical packet signal; and
an assister controlling power of assist light in accordance with a signal from the packet scheduler and causing the assist light to be wavelength-multiplexed with the wavelength multiplexed light such that a total sum of power of the wavelength multiplexed light and the power of the assist light is held constant under a predetermined condition,
wherein the packet scheduler controls a timing at which the assister transmits the assist light, in accordance with a timing of the wavelength multiplexed light,
wherein the assister comprises:
a light source for outputting the assist light;
a second multiplexer for multiplexing the assist light output from the light source with the wavelength multiplexed light having been subjected to the wavelength multiplexing by the aforesaid multiplexer; and
an assist light controller for controlling the power of the assist light output from the light source to power providing the constant total sum,
further comprising a splitter for splitting part of the wavelength multiplexed light, which has been subjected to the wavelength multiplexing by the aforesaid multiplexer, in a stage upstream of the second multiplexer; and
a monitor for monitoring power of the wavelength multiplexed light split by the splitter,
wherein the assister controls the power of the assist light to power providing the constant total sum based on the power monitored by the monitor.

2. The optical packet switching apparatus according to claim 1, wherein each of the plurality of transmitters comprises:
a producer for producing an optical signal having a variable wavelength; and
a gate switch for blocking off the optical signal produced by the producer during a wavelength switching period of the optical signal.

3. The optical packet switching apparatus according to claim 2, wherein the gate switch switches over ON/OFF-states of the optical packet signal, and
the assister calculates the number of multiplexed wavelengths in the wavelength multiplexed light based on ON/OFF switching information of the gate switch in each of the plural transmitters, and controls the power of the assist light to power providing the constant total sum based on the calculated number of multiplexed wavelengths.

4. The optical packet switching apparatus according to claim 2, wherein the gate switch transmits the optical signal, as the optical packet signal, by intermittently blocking off the optical signal in a way to divide the optical signal in units of the optical packet signal.

5. The optical packet switching apparatus according to claim 1, further comprising a delayer for delaying the wavelength multiplexed light output from the aforesaid multiplexer to the second multiplexer.

6. The optical packet switching apparatus according to claim 1, wherein the assister multiplexing the assist light that has a wavelength differing from a wavelength of the optical packet signal and falling within an amplification band of the amplifier.

7. An optical packet switching apparatus comprising:
a plurality of transmitters for transmitting optical packet signals having wavelengths;
a multiplexer for multiplexing the optical packet signals transmitted by the plurality of transmitters;
a packet scheduler controlling a timing at which each of the transmitters transmits the optical packet signal; and an assister controlling power of assist light in accordance with a signal from the packet scheduler and causing the assist light to be wavelength-multiplexed with the wavelength multiplexed light such that a total sum of power of the wavelength multiplexed light and the power of the assist light is held constant under a predetermined condition, wherein the assister comprises:

a light source for outputting the assist light;

a second multiplexer for multiplexing the assist light output from the light source with the wavelength multiplexed light having been subjected to the wavelength multiplexing by the aforesaid multiplexer; and an assist light controller for controlling the power of the assist light output from the light source to power providing the constant total sum, and wherein the assist light controller compensates for a delay difference between the assist light input to the second multiplexer and the wavelength multiplexed light by controlling the light source to output the assist light after delaying the assist light by a predetermined delay amount.

8. The optical packet switching apparatus according to claim 7, further comprising a second monitor for monitoring power of the wavelength multiplexed light obtained with the wavelength multiplexing of the assist light by the assister, wherein the transmitter transmits an optical signal in a fixed pattern before transmitting the optical packet signal, and the assist light controller outputs assist light in a pattern reversal to the fixed pattern before the optical packet signal is transmitted, and sets the delay amount based on the power monitored by the second monitor.

9. The optical packet switching apparatus according to claim 8, wherein the assist light controller sets, as the delay amount, a delay amount resulting from shifting, through a half cycle, a delay amount at which a variation in the power monitored by the second monitor is minimized.

10. The optical packet switching apparatus according to claim 7, wherein the assist light controller sets, for each of the plurality of transmitters, a predetermined delay amount by which the assist light is delayed.

11. An optical packet switching method comprising:

transmitting optical packet signals having variable wavelengths by a plurality of transmitters;

wavelength multiplexing of the optical packet signals transmitted in the transmission operation;

multiplexing assist light with wavelength multiplexed light having been subjected to the wavelength multiplexing in the multiplexing operation such that a total sum of power of the wavelength multiplexed light and power of the assist light is held constant in a predetermined condition;

controlling a transmission timing of the assist light in accordance with a timing of the wavelength multiplexed light;

demultiplexing the wavelength multiplexed light and outputting the demultiplexed optical packet signals from ports corresponding to respective wavelengths;

outputting the assist light from a light source;

multiplexing the assist light output from the light source with the wavelength multiplexed light having been subjected to the wavelength multiplexing;

controlling the power of the assist light output from the light source to power providing the constant total sum, splitting part of the wavelength multiplexed light, which has been subjected to the wavelength multiplexing, in a stage upstream of the second multiplexer; and monitoring power of the wavelength multiplexed light split by the splitter, wherein the assister controls the power of the assist light to power providing the constant total sum based on the power monitored by the monitor.

* * * * *

UNITED STATES PATENT AND TRADEMARK OFFICE
CERTIFICATE OF CORRECTION

PATENT NO. : 8,331,780 B2  
APPLICATION NO. : 12/363203  
DATED : December 11, 2012  
INVENTOR(S) : Yutaka Kai Page 1 of 1

It is certified that error appears in the above-identified patent and that said Letters Patent is hereby corrected as shown below:

Title Page Col. 2, item (56), (Other Publications); Line 1, Delete "Publshed" and insert -- Published --, therefor.

Signed and Sealed this  
Fifth Day of March, 2013

Teresa Stanek Rea  
*Acting Director of the United States Patent and Trademark Office*